United States Patent
Giger et al.

(10) Patent No.: US 7,418,123 B2
(45) Date of Patent: Aug. 26, 2008

(54) AUTOMATED METHOD AND SYSTEM FOR COMPUTERIZED IMAGE ANALYSIS FOR PROGNOSIS

(75) Inventors: Maryellen L. Giger, Elmhurst, IL (US); Ioana Bonta, Chicago, IL (US); Ruth Heimann, Burlington, VT (US); Robert M. Nishikawa, Batavia, IL (US); Carl J. Vyborny, Riverside, IL (US)

(73) Assignee: University of Chicago, Chicago, IL (US)

( * ) Notice: Subject to any disclaimer, the term of this patent is extended or adjusted under 35 U.S.C. 154(b) by 699 days.

(21) Appl. No.: 10/617,675

(22) Filed: Jul. 14, 2003

(65) Prior Publication Data

US 2004/0101181 A1 May 27, 2004

Related U.S. Application Data

(60) Provisional application No. 60/395,305, filed on Jul. 12, 2002.

(51) Int. Cl.
*G06K 9/00* (2006.01)
(52) U.S. Cl. ...................................... 382/132
(58) Field of Classification Search .......... 382/128–131
See application file for complete search history.

(56) References Cited

U.S. PATENT DOCUMENTS 5,657,362 A * 8/1997 Giger et al. ............... 378/37
6,112,112 A * 8/2000 Gilhuijs et al. ........... 600/425
6,253,210 B1 * 6/2001 Smith et al. ............. 707/104.1
6,282,305 B1 * 8/2001 Huo et al. ................ 382/128
6,317,617 B1 * 11/2001 Gilhuijs et al. ........... 600/408
6,898,303 B2 * 5/2005 Amato et al. ............. 382/131
6,956,975 B2 * 10/2005 Young ...................... 382/263

OTHER PUBLICATIONS

Ravdinp,. M., and G. M. Clark1. 992. A Practical Application of Neural Network Analysis for Predicting Outcome of Individual Breast Cancer Patients. Breast Cancer Res. and Treat. 22, 285-293.*

(Continued)

*Primary Examiner*—Bhavesh Mehta
*Assistant Examiner*—Hadi Akhavannik
(74) *Attorney, Agent, or Firm*—Oblon, Spivak, McClelland, Maier & Neustadt, P.C.

(57) ABSTRACT

An automated method for determining prognosis based on an analysis of abnormality (lesion) features and parenchymal features obtained from medical image data of a patient. The techniques include segmentation of lesions from radiographic images, extraction of lesion features, and a merging of the features (with and without clinical information) to yield as estimate of the prognosis for the specific case. An example is given for the prognosis of breast cancer lesions using mammographic data. A computerized image analysis system for assessing prognosis combines the computerized analysis of medical images of cancerous lesions with the training-based methods of assessing prognosis of a patient, using indicators such as lymph node involvement, presence of metastatic disease, local recurrence, and/or death. It is expected that use of such a system to assess the severity of the disease will aid in improved decision-making regarding treatment options.

48 Claims, 12 Drawing Sheets

OTHER PUBLICATIONS

L. Ohno-Machado, M. A. Musen. Modular Neural Networks for Medical Prognosis: Quantifying the Benefits of Combining Neural Networks for Survival Prediction. 1996.*

U.S. Appl. No. 10/617,675, filed Jul. 14, 2003, Giger et al.
U.S. Appl. No. 10/724,395, filed Dec. 1, 2003, Giger et al.
U.S. Appl. No. 10/777,041, filed Feb. 13, 2004, Giger et al.

* cited by examiner

Node-Positive

Texture: 0.48
RadGr_ROI: 0.62
RadGr_Mar: 0.62
LDA: −1.445

Node-Negative

Texture: 5.13
RadGr_ROI: 0.65
RadGr_Mar: 0.64
LDA: 4.8

US 7,418,123 B2

AUTOMATED METHOD AND SYSTEM FOR COMPUTERIZED IMAGE ANALYSIS FOR PROGNOSIS

CROSS-REFERENCE TO RELATED APPLICATIONS

The present application claims priority to the earlier filing date of provisional U.S. Application No. 60/395,305, filed Jul. 12, 2002, the entire contents of which are incorporated herein by reference.

STATEMENT REGARDING FEDERALLY SPONSORED RESEARCH

The present invention was made in part with U.S. Government support under NIH Grant No. CA89452. The U.S. Government may have certain rights to this invention.

BACKGROUND OF THE INVENTION

Field of the Invention

The present invention relates generally to systems and methods for computer-aided diagnosis in the assessment of a prognosis for cancer patients.

The present invention also generally relates to automated techniques for the detection of abnormal anatomic regions, for example, as disclosed, in particular, in one or more of U.S. Pat. Nos. 4,907,156; 5,133,020; 5,832,103; and 6,138,045; all of which are incorporated herein by reference.

The present invention also generally relates to computerized techniques for automated analysis of digital images, for example, as disclosed in one or more of U.S. Pat. Nos. 4,839,807; 4,841,555; 4,851,984; 4,875,165; 4,918,534; 5,072,384; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,141,437; 6,185,320; 6,205,348; 6,240,201; 6,282,305; 6,282,307; 6,317,617 as well as U.S. patent application Ser. Nos. 08/173,935; 08/398,307 (PCT Publication WO 96/27846); 08/536,149; 08/900,189; 09/027,468; 09/141,535; 09/471,088; 09/692,218; 09/716,335; 09/759,333; 09/760,854; 09/773,636; 09/816,217; 09/830,562; 09/818,831; 09/842,860; 09/860,574; 60/160,790; 60/176,304; 60/329,322; 09/990,311; 09/990,310; 09/990,377; 10/360,814; and 60/331,995; and PCT patent applications PCT/US98/15165; PCT/US98/24933; PCT/US99/03287; PCT/US00/41299; PCT/US01/00680; PCT/US01/01478 and PCT/US01/01479, all of which are incorporated herein by reference.

The present invention includes the use of various technologies referenced and described in the above-noted U.S. Patents, as well as described in the references identified in the following LIST OF REFERENCES by the author(s) and year of publication and cross-referenced throughout the specification by reference to the respective number in parentheses, of the reference:

LIST OF REFERENCES

1. Feig S A: Decreased breast cancer mortality through mammographic screening: Results of clinical trials. *Radiology*, 167:659-665, 1988.
2. Tabar L, Fagerberg G, Duffy S W, Day N E, Gad A, Grontoft O: Update of the Swedish two-county program of mammographic screening for breast cancer. *Radiol Clin North Am* 30:187-210, 1992.
3. Smart C R, Hendrick R E, Rutledge J H, Smith R A: Benefit of mammography screening in women ages 40 to 49 years: Current evidence from randomized controlled trials. *Cancer* 75:1619-26, 1995.
4. Bassett L W, Gold R H: *Breast Cancer Detection: Mammography and Other Methods in Breast Imaging* New York: Grune and Stratton, 1987.
5. Kopans D B: *Breast Imaging*. Philadelphia: JB Lippincott, 1989.
6. Brown M L, Houn F, Sickles E A, Kessler L G: Screening mammography in community practice: positive predictive value of abnormal findings and yield of follow-up diagnostic procedures. *AJR* 165:1373-1377, 1995.
7. Giger M L: Computer-aided diagnosis. *Syllabus: A Categorical Course on the Technical Aspects of Breast Imaging*, edited by Haus A, Yaffe M. Oak Brook, Ill: RSNA Publications, 1993, pp. 272-298.
8. Vyborny C J, Giger M L: Computer vision and artificial intelligence in mammography. *AJR* 162:699-708, 1994.
9. Giger M L, Huo Z, Kupinski M A, Vyborny C J: "Computer-aided diagnosis in mammography", In: *Handbook of Medical Imaging, Volume 2. Medical Imaging Processing and Analysis*, (Sonka M, Fitzpatrick M J, eds) SPIE, pp. 915-1004, 2000.
10. D'Orsi C J, Bassett L W, Feig S A, Jackson V P, Kopans D B, Linver M N, Sickles E A, Stelling C B: Breast Imaging Reporting and Data System (BI-RADS). Reston, Va. (American College of Radiology), 1998.
11. Getty D J, Pickett R M, D'Orsi C J, Swets J A: Enhanced interpretation of diagnostic images. *Invest. Radiol*, 23: 240-252, 1988.
12. Swets J A, Getty D J, Pickett R M, D'Orsi C J, Seltzer S E, McNeil B J: Enhancing and evaluating diagnostic accuracy. *Med Decis Making* 11:9-18, 1991.
13. Cook H M, Fox M D: Application of expert systems to mammographic image analysis. *American Journal of physiologic Imaging*, 4: 16-22, 1989.
14. Gale A G, Roebuck E J, Riley P, Worthington B S, et al.: Computer aids to mammographic diagnosis. *British Journal of Radiology*, 60: 887-891, 1987.
15. Getty D J, Pickett R M, D'Orsi C J, Swets J A: Enhanced interpretation of diagnostic images. *Invest. Radiol*. 23: 240-252, 1988.
16. Swett H A, Miller P A: ICON: A computer-based approach to differential diagnosis in radiology. *Radiology* 163: 555-558, 1987.
17. Huo Z, Giger M L, Vyborny C J, Bick U, Lu P, Wolverton D E, Schmidt R A: Analysis of spiculation in the computerized classification of mammographic masses, *Medical Physics* 22:1569-1579, 1995.
18. Jiang Y, Nishikawa R M, Wolverton D E, Giger M L, Doi K, Schmidt R A, Vyborny C J: Automated feature analysis and classification of malignant and benign clustered microcalcifications. *Radiology* 198(3):671-678, 1996.
19. Ackerman L V, Gose E E: Breast lesion classification by computer and xeroradiography. *Breast Cancer* 30:1025-1035, 1972.
20. Patrick E A, Moskowitz M, Mansukhani V T, Gruenstein E I: Expert learning system network for diagnosis of breast calcifications. *Invest Radiol* 16: 534-539, 1991.
21. Huo Z, Giger M L, Vyborny C J, Wolverton D E, Schmidt R A, Doi K: Automated computerized classification of 21. malignant and benign mass lesions on digitized mammograms. *Academic Radiology* 5: 155-168, 1998.
22. Jiang Y, Nishikawa R M, Schmidt R A, Metz C E, Giger M L, Doi K: Improving breast cancer diagnosis with computer-aided diagnosis. *Academic Radiology* 6: 22-33, 1999.
23. Huo Z, Giger M L, Metz C E: Effect of dominant features on neural network performance in the classification of mammographic lesions. *PMB* 44: 2579-2595, 1999.
24. Huo Z, Giger M L, Vyborny C J, Wolverton D E, Metz C E: Computerized classification of benign and malignant masses on digitized mammograms: a robustness study. *Academic Radiology* 7:1077-1084 2000.
25. Thurfjell M G. Aspects in mammographic screening. Detection, prediction, recurrence and prognosis *Acta Radiol Supp,l* 2001 December, 42(424):1-22.
26. Colpaert C, Vermeulen P, Jeuris W, van Beest P, Goovaerts G, Weyler J, Van Dam P, Dirix L, Van Marck E. Early distant relapse in "node-negative" breast cancer patients is not predicted by occult axillary lymph node metastases, but by the features of the primary tumour. *J Pathol.* 2001 April; 193(4):442-9.
27. Heimann R, Hellman S. Clinical progression of breast cancer malignant behaviour: what to expect and when to expect it, *Journal of Clinical Oncology.* 2000 February; 18(3)591-599.
28. Heimann R, Hellman S. Individual characterisation of the metastatic capacity of human breast carcinoma. *European Journal of Cancer,* 2000; 36: 1631-1639.
29. Heimann R, Lan F, McBride R, Hellman S. Separating favorable from unfavorable prognostic markers in breast cancer: the role of E-cadherin *Cancer Research.* 2000 January; 60, 298-304.
30. Tabar L, Chen H H, Duffy S W, Yen M F, Chiang C F, Dean P B, Smith R A. A novel method for prediction of long-term outcome of women with T1a, T1b, and 10-14 mm invasive breast cancers: a prospective study *Lancet.* 2000 February 5;355(9202):429-33.
31. Thurfjell E, Thurfjell M G, Lindgren A. Mammographic finding as predictor of survival in 1-9 mm invasive breast cancers. worse prognosis for cases presenting as calcifications alone. *Breast Cancer Res Treat.* 2001 May; 67(2): 177-80.
32. Liljegren G, Lindgren A, Bergh J, Nordgren H, Tabar L, Holmberg L. Risk factors for local recurrence after conservative treatment in stage I breast cancer. Definition of a subgroup not requiring radiotherapy. *Ann Oncol.* 1997 March, 8(3):235-41.
33. Tabar L, Fagerberg G, Chen H H, Duffy S W, Gad A. Tumour development, histology and grade of breast cancers: prognosis and progression, *Int J Cancer.* 1996 May 16;66(4):413-9.
34. Metz C E. ROC methodology in radiologic imaging. *Invest Radiol.* 1986; 21:720-733.
35. Giger M L: "Future of breast imaging. Computer-aided diagnosis". *AAPM/RSNA Categorical Course on the Technical Aspects of Breast Imaging,* 3rd edition, (Haus A. and Yaffe M., eds.) pp. 287-302, 1994.
36. Giger M L, Vyborny C J, Schmidt R A: Computerized characterization of mammographic masses: Analysis of spiculation. *Cancer Letters,* 77: 201-211, 1994.
37. Kupinski M A, Giger M L: Feature selection with limited datasets. *Medical Physics,* 26: 2176-2182, 1999.
38. Kupinski M A, Edwards D C, Giger M L, Metz C E: Ideal observer approximation using Bayesian classification neural networks. *IEEE-Trans Medical Imaging,* 20: 886-899, 2001.
39. Huo Z, Giger M L, Vyborny C J: Computerized analysis of multiple-mammographic views: Potential usefulness of special view mammograms in computer-aided diagnosis. *IEEE Transactions on Medical Imaging,* 20: 1285-1292, 2001.
40. Huo Z, Giger M L, Vyborny C J, Metz C E: Effectiveness of CAD in the diagnosis of breast cancer: An observer study on an independent database of mammograms, *Radiology,* 224:560-568, 2002.
41. Huo Z, Giger M L, Wolverton D E, Zhong W, Cumming S, Olopade O I: Computerized analysis of mammographic parenchymal patterns for breast cancer risk assessment: Feature selection. *Medical Physics,* 27: 4-12, 2000.
42. Huo Z, Giger M L, Olopade O I, Wolverton D E, Weber B L, Metz C E, Zhong W, Cummings S: Computerized analysis of digitized mammograms of BRCA1/BRCA2 gene mutation carriers. *Radiology,* 225:519-526, 2002.
43. Byng J W, Boyd N F, Fishell E, Jong R and Yaffe M J. Automated analysis of mammographic densities. *Phys Med Biol* 1996; 1996:909-923.
44. Tahoces P, Correa J, Souto M, Gomes L and Vidal J. Computer-assisted diagnosis: the classification of mammographic breast parenchymal patterns. *Phys Med Biol* 1995; 40:103-117.
45. Kirkwood B R. *Essentials of Medical Statistics,* Blackwell Scientific Publications, London, 1988.
46. Rumelhart D E, Hinton G E, Williams R J: Learning internal representation by error propagation. *Parallel Distributed Processing.* MIT Press 1: 318-362, 1986.
47. Kupinski M A, Giger M L. Investigation of regularized neural networks for the computerized detection of mass lesions in digital mammograms. *Proceedings IEEE Engineering in Medicine and Biology Society Conference*, Chicago, Ill., 1997.
48. Kupinski M A, Edwards D C, Giger M L. Ideal observer estimation with Bayesian classification neural networks. *Eighth Far West Image Perception Conference,* Alberta, Canada, 1999.
49. Kupinski M A, Edwards D C, Giger M L, Baehr A E. Bayesian artificial neural networks in the computerized detection of mass lesions, *AAPM,* Nashville, Tenn., 1999.
50. Ruck D W, Rogers S K, Kabrisky M, et al. The multilayer perceptron as an approximation to a Bayes optimal discriminant function. *IEEE Trans Neural Networks,* 1: 296-298, 1990.
51. Jiang Y, Metz C E, and Nishikawa R M (1996). A receiver operating characteristics partial area index for highly sensitive diagnostic tests. *Radiology,* 201:745-750.
52. Metz C E, Herman B A, Shen J H. Maximum likelihood estimation of receiver operating characteristic (ROC) curves from continuously-distributed data. *Statistics in Medicine,* 17:1033-1053, 1998.
53. Metz C E, Shen J H, Kronman H B, Wang P L. CLABROC [computer program]. Chicago: University of Chicago, 1991.
54. Cox D. R. (1972). Regression models and life tables (with discussion). *J. Roy. Statist. Soc. B* 34:187-220.
55. Kay R. (1977). Proportional hazard regression models and the analysis of censored survival data. *Appl. Statist.* 36:227-237.
56. Schoenfeld D (1982). Partial residuals for the proportional hazards regression model, *Biometrika,* 69:239-241.
57. Harrell F E, Lee K L, and Mark D B (1996). Tutorial in biostatistics multivariable prognostic models: Issues in developing models, evaluating assumptions and adequacy, and measuring and reducing errors. *Statistics in Medicine,* 15:361-387.

The entire contents of each related patent listed above and each reference listed in the LIST OF REFERENCES, are incorporated herein by reference.

DISCUSSION OF THE BACKGROUND

Breast cancer remains a disease without a cure unless the cancer is found at a sufficiently early stage and subsequently surgically removed, irradiated, or eradicated with chemotherapy. Major research issues include those focused on genetic and molecular forms of detection and treatment; and those focused on anatomical levels of prevention, detection, and treatment. In these various areas, the role of the human interpreter (e.g., oncologist, radiologist, pathologist, surgeon, primary care physician) varies. However, the very presence of a human interpreter introduces subjective judgment into the decision-making process—whether it be in the initial detection (or mis-detection) of a lesion on a mammogram, or in the surgical decision regarding the type of incision. Thus, while ongoing research is needed to understand the biological aspects of cancer, to improve the physical aspects of instrumentation to better "see" the cancer, and to improve the biological/chemical/physical aspects of therapy, research is also needed to improve the human role in the overall management of the patient. Multi-modality and multi-disciplinary decision making on patient management, requiring inputs from oncologists, pathologists, radiologists, surgeons, and risk clinic physicians, can be quite subjective, as is often evident during case management conferences. Although "subjective" does not necessarily mean "poor judgement," it does allow sub-optimal and inconsistent decision making.

Breast cancer is the leading cause of death for women in developed countries. Early detection of breast cancer increases the success of treatment dramatically. Thus, screening for breast cancer of women over 40 years of age is generally recommended. Current methods for detecting and diagnosing breast cancer include mammography, sonography (also referred to as ultrasound), and magnetic resonance imaging (MRI).

Mammography is the most effective method for the early detection of breast cancer. Periodic screening of asymptomatic women has been shown to reduce mortality [1-6]. Many breast cancers are detected and referred for surgical biopsy on the basis of a radiographically detected mass lesion or cluster of microcalcifications. Although general rules for the differentiation between benign and malignant mammographically identified breast lesions exist, considerable misclassification of lesions occurs with the current methods. On average, less than 30% of masses referred for surgical breast biopsy are actually malignant.

Currently, computerized analysis schemes are being developed to aid in distinguishing between malignant and benign lesions in order to improve both sensitivity and specificity. Comprehensive summaries of investigations in the field of mammography CAD have been published by Giger and colleagues [7-9]. Investigators have used computers to aid in the decision-making process regarding likelihood of malignancy and patient management using human-extracted features and BI-RADS [10-13]. Such methods are dependent on the subjective identification and interpretation of the mammographic data by human observers.

Gale et al. [14] and Getty et al. [15] each developed computer-based classifiers, which take as input diagnostically relevant features obtained by the reading of breast images by radiologists. Getty et al. found that with the aid of the classifier, community radiologists performed as well as unaided expert mammographers in making benign-malignant decisions. Swett et al. [16] developed an expert system to provide visual and cognitive feedback to the radiologist using a critiquing approach combined with an expert system. Other investigators have developed methods based on computer-extracted features [17-24]. The benefit of using computer-extracted features is the objectivity and reproducibility of the result. Radiologists employ many radiographic image features, which they seem to extract and interpret simultaneously and instantaneously. Thus, the development of methods using computer-extracted features requires, besides the determination of which individual features are clinically significant, the computerized means for the extraction of each such feature.

Spatial features, which are characteristic of lesions, have been shown to be extractable by a computer analysis of the mammograms, and to be useful in distinguishing between malignant and benign lesions. Most methods are evaluated in terms of their ability to distinguish between malignant and benign lesions, although a few have been evaluated in terms of patient management (i.e., return to screening vs. biopsy). It is important to state that while one of the aims of computerized classification is to increase sensitivity, another is to reduce the number of benign cases sent for biopsy. Such a reduction will be clinically acceptable only if it does not result in un-biopsied malignant cases, however, since the "cost" of a missed cancer is much greater than misclassification of a benign case. Thus, computer classification schemes should be developed to improve specificity, but not at the loss of sensitivity. It has been shown that the computerized analysis of mass lesions [17][21] and clustered microcalcifications [18][22] on digitized mammograms yields performances similar to an expert mammographer, and significantly better than average radiologists in the task of distinguishing between malignant and benign lesions.

Giger et al. [35-40] have been successful in developing mathematical descriptors of breast lesions in mammography, ultrasound, and MRI for the task of estimating the likelihood of malignancy. The computerized classification scheme for mass lesions is based on the degree of spiculation exhibited by the mass in question. Various features related to the margin, shape, and density of each mass can also be extracted automatically from the neighborhoods of the computer-extracted mass regions. Similarly, computer-extracted features in sonography of the breast as well as both spatial and temporal lesion characteristics in dynamic MRI of the breast have been investigated. Selected features were merged into an estimated likelihood of malignancy by use of an artificial neural network. Evaluation was performed using independent test sets and ROC analysis. Results from an independent evaluation of 110 cases indicated that the classification scheme is robust to the variations in case-mix and digitization techniques. In an observer study including six mammographers and six community general radiologists using the independent database, use of computer results as an aid yielded significant improvement in their performance. Similar results were found for ultrasound CAD in an observer study. While these results we obtained in the task of characterizing malignant and benign lesions, similar features may be used to characterize cancer of various appearances.

Further, Giger et al. [41][42] have developed computerized methods for characterizing "normal" breast structure that may be used together with clinical measures of risk for use in quantitatively characterizing the breast parenchyma and risk of cancer. In initial studies, three different approaches were investigated to relate mammographic patterns, as characterized by computer-extracted features, to the risk of developing breast cancer, using three high-risk groups: (a) BRCA1/BRCA2 mutation carriers, (b) women with unilateral breast cancer, and (c) women with a strong family history of breast/ovarian cancer and/or with a history of previous breast biopsy for benign diseases; and a low-risk group including women with no family history of breast/ovarian cancer and no prior history of breast cancer and benign breast disease. Quantitative analyses of mammographic patterns, from all three groups, indicated that women at high risk tend to have dense breast with coarse and low-contrast texture patterns. While these computer-extracted features were developed to help determine risk of breast cancer, these features and derivatives and extensions of them may be used to characterize the parenchyma in general in terms of density and texture.

With respect to prognosis, histological features of the primary tumor have been shown to predict prognosis in terms of early distant relapse in node-negative breast cancer patients [26]. Tumor progression was shown to be correlated with increasing tumor size and nodal involvement [27][33]. In addition, various biomarkers have been investigators as prognostic factors [28][29]. Also, visual mammographic classification seems to predict good and bad long-term outcomes for survival in tumors of 14 mm or smaller [30][31]. Others have also investigated the use of clinical and mammographic appearance of tumors as a means to predict the risk of local recurrence [32].

SUMMARY OF THE INVENTION

Accordingly, an object of this invention is to provide a method and system that analyzes abnormalities and parenchyma regions in medical images to yield information on prognosis.

Another object of this invention is to provide a method and system that distinguishes between different types of cancerous lesions in terms of their severity and prognosis. This can be achieved by varying the "truth" in the training of the computer system.

These and other objects are achieved according to the invention by providing a new automated method and system that analyzes lesions on medical images in which the output of the analysis relates to the prognosis.

Accordingly, the present invention is directed to an automated, computerized method for the prognosis of lesions. The techniques include (1) segmentation of lesions from radiographic images, (2) extraction of lesion features, and (3) a merging of the features (with and without clinical information), to yield as estimate of the prognosis for the specific case. An example is given for the prognosis of breast cancer lesions on mammograms.

According to one aspect of the present invention, there is provided a method, system, and computer program product for processing medical image data to determine a prognosis on recovery, comprising: (1) obtaining segmented image data of a portion of the medical image data corresponding to an abnormality; (2) extracting at least one abnormality feature from the segmented image data corresponding to the abnormality; and (3) determining the prognosis on recovery based on the extracted at least one abnormality feature.

According to one aspect of the present invention, the step of extracting at least one abnormality feature comprises determining a radial gradient index.

According to another aspect of the present invention, the step of extracting at least one abnormality feature comprises determining at least one of circularity and density of the abnormality.

According to still another aspect of the present invention, the step of extracting at least one abnormality feature comprises determining at least one of average gray level, contrast, and a texture measure of the abnormality.

According to still another aspect of the present invention, the determining step comprises applying the extracted at least one abnormality feature to an artificial neural network (ANN) which classifies the abnormality at an output of the ANN.

According to still another aspect of the present invention, the determining step comprises applying the extracted at least one abnormality feature to a linear discriminant which classifies the abnormality at an output of the linear discriminant.

According to another aspect of the present invention, there is provided a method, system, and computer program product for processing medical image data to determine a prognosis on recovery, comprising: (1) obtaining segmented image data of a portion of the medical image data corresponding to a parenchyma region; (2) extracting at least one parenchyma feature from the segmented image data corresponding to the parenchyma region; and (3) determining the prognosis based on the extracted at least one parenchyma feature.

According to still another aspect of the present invention, there is provided a method, system, and computer program product for processing medical image data to determine a prognosis on recovery, comprising: (1) obtaining segmented image data of a portion of the medical image data corresponding to an abnormality; (2) extracting at least one abnormality feature from the segmented image data corresponding to the abnormality; (3) obtaining segmented image data of a portion of the medical image data corresponding to a parenchyma region; (4) extracting at least one parenchyma feature from the segmented image data corresponding to the parenchyma region; and (5) determining the prognosis on recovery based on the extracted at least one abnormality feature and the extracted at least one parenchyma feature.

Further, the present invention is embodied in a computerized image analysis system for assessing prognosis that combines the computerized analysis of medical images of abnormalities (e.g., cancerous lesions) with the training-based method of assessing prognosis of a patient, such as lymph node involvement, presence of metastatic disease, local recurrence, and/or death. It is expected that use of such a system to assess the severity of the disease will aid in improved decision making regarding treatment options.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Due to the subjective nature of human interpretation of mammographic images for diagnosis or prognosis, a method for assessing prognosis based on a computer analysis of the image of the lesion has been developed. Similar lesion features as those for diagnosis may be extracted, although the analysis of the features and the training of the computer system requires different truth. For prognosis, that truth can be lymph node involvement, presence of metastatic disease, local recurrence, and/or death.

Lymph node status is a useful marker for assessing the extent of diagnosed breast cancer. The more extended, the poorer the prognosis. Lymph node status influences the choice of treatment. Thus, in the particular example presented here, lymph node involvement is used as the truth.

The present invention involves the use of computer-aided diagnosis as an aid to radiologists in the assessment of the cancerous lesion on mammography. The mass analysis method typically includes three components: (1) automated segmentation of mass regions; (2) automated feature-extraction; and (3) automated assessment of prognosis. The method is trained with truth of patients, such as lymph node involvement, presence of metastatic disease, local recurrence, and/or death.

A method and system that employs a lesion assessment module for assessing the prognosis is presented below. The specific example presented here includes a computerized method for the characterization of mammographic lesions for prognosis based on image analysis of mammograms. Using a combination of the lesion features can result in improved assessment of prognosis. A computerized image analysis system for assessing prognosis combines the computerized analysis of medical images of cancerous lesions with training based on methods of assessing prognosis of a patient, such as lymph node involvement, presence of metastatic disease, local recurrence, and/or death. It is expected that the use of such a system to assess the severity of the disease will aid in improved decision-making regarding treatment options.

Figure 1:
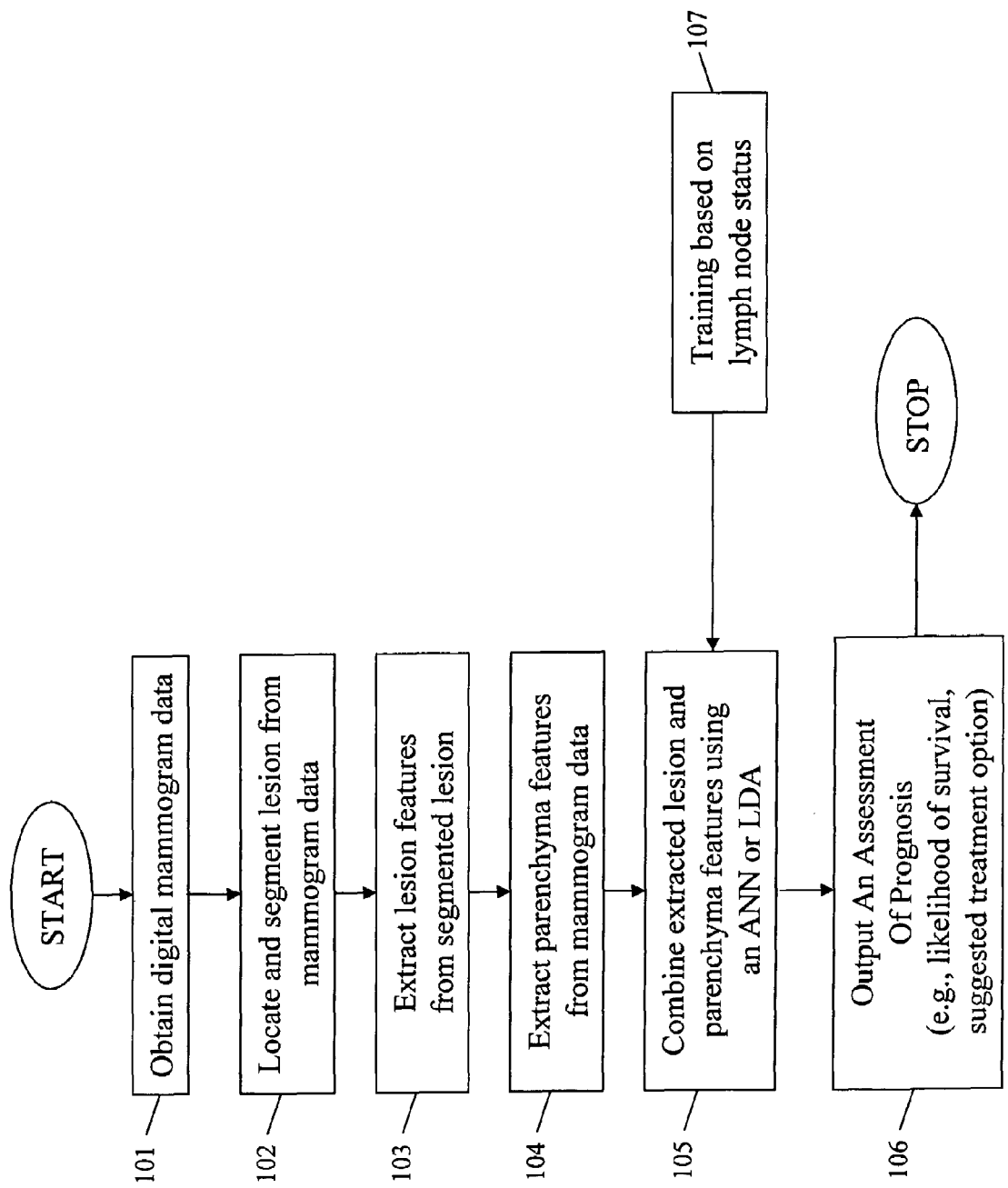
FIG. 1 illustrates a specific example (breast cancer prognosis) of the method of computerized image analysis for assessment of a prognosis according to the present invention.

Referring now to the drawings, and more particularly to FIG. 1 thereof, there is shown a schematic diagram of the method that takes as input a mammogram and outputs the assessment of prognosis for a specific disease. In the various methods for implementing this technique, various features either manually determined or extracted by computer are used. In addition, various truths may be used individually or combined to train a computerized image analyzer for the assessment of prognosis. These truths include lymph node involvement, presence of metastatic disease, presence of local recurrence, and death.

In step 101, digital mammographic data is obtained. As will be described in more detail below, at least one lesion is located and segmented in step 102. Next, in step 103, various mathematical features of the lesion are extracted from the segmented lesion identified in step 102. Additionally, in step 104, parenchyma features are also extracted from the mammogram data. As described below, the parenchyma features are obtained from a parenchyma region distinct from that of the segmented lesion in the mammogram. Alternatively, a second mammogram may be used to obtain the parenchyma features.

In step 105, the lesion and parenchyma features are combined using classifier, such as a neural network or linear discriminant, to produce a numerical indication of the prognosis of recovery. Alternatively, the inputs to the classifier may be only the lesion features or only the parenchyma features. In step 106, an assessment of the prognosis, including, e.g., the likelihood of survival or suggested treatment is displayed. Step 107 is directed to the a priori training of the classifier using truth indicators such as lymph node status.

Figure 3:
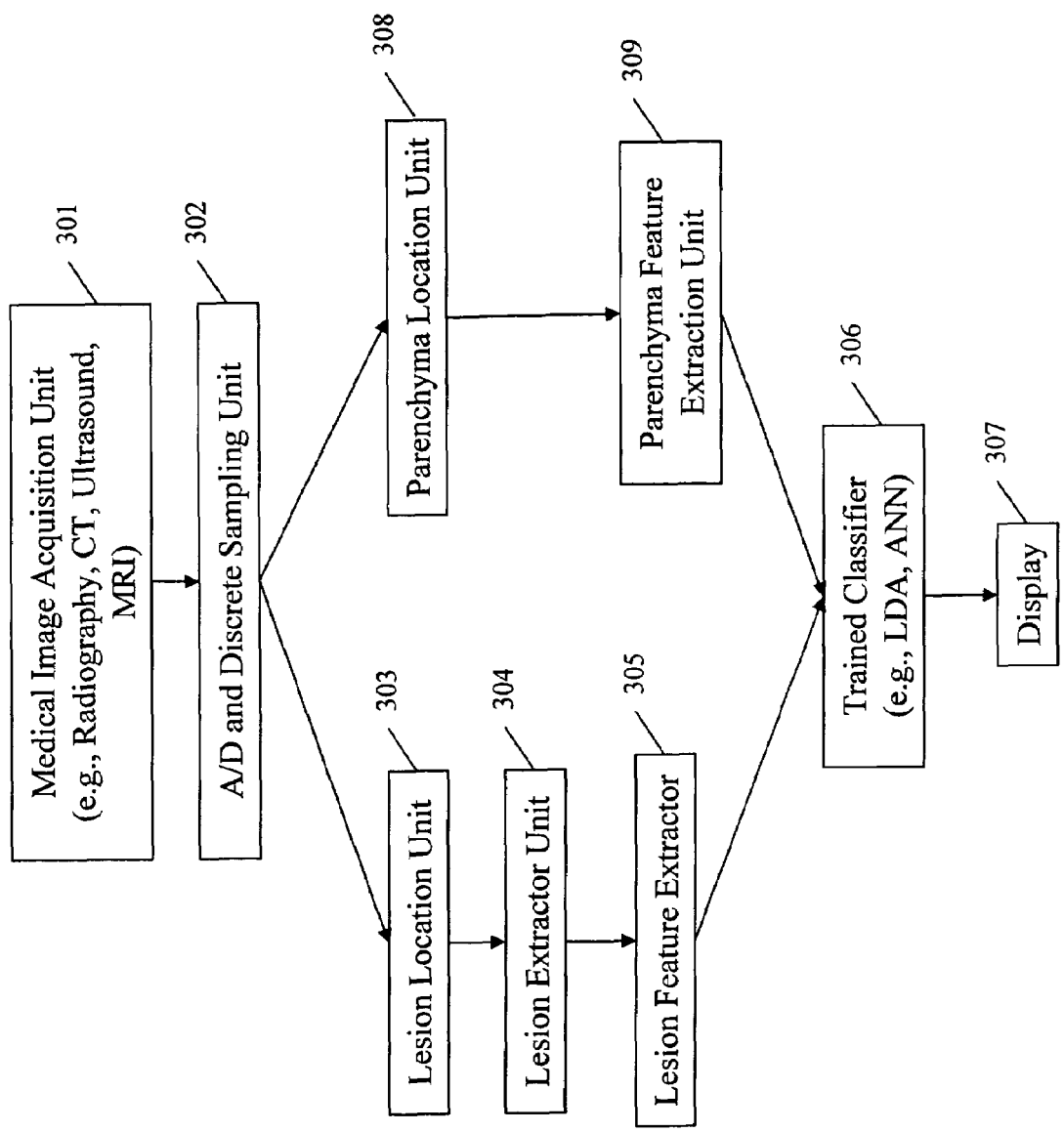
FIG. 3 is a diagram of the general system for computerized image analysis for assessment of a prognosis according to the present invention.

FIG. 3 illustrates the system for determining prognosis on recovery according to the present invention. The medical image is acquired by the medical image acquisition unit 301 and converted, if necessary, to digital format by the A/D and Discrete Sampling Unit 302. The digitized image is then processed by the lesion location unit 303 and the lesion extractor unit 304. Region growing is performed by the lesion extractor 304 to extract at least one lesion, including its margin. After lesion extraction, the lesion feature extractor 305 computes numerical descriptions of lesion features, described below. The numerical descriptors of the lesion are then classified by the already-trained classifier 306, which may be an ANN or a linear discriminant.

Additionally, the parenchyma location unit 308 locates a parenchyma region within the medical image acquired by the medical image acquisition unit 301. Note that the parenchyma region may alternatively be located in a different medical image than the one processed by the lesion locator unit. For example, an image of the contralateral breast may be used to locate the parenchyma region in a breast cancer prognosis determination.

The parenchyma feature extraction unit 309 calculates parenchyma feature values from the pixel values in the parenchyma region obtained by the parenchyma location unit 308. The parenchyma feature values also input into the trained classifier 306. Note that, in addition to the computer-extracted features, clinical data, such as patient age, can also be incorporated in the classifier as additional features.

In an alternative embodiment, only the lesion features output from the lesion feature extractor 305 are input into the trained classified 306. In a second alternative embodiment, only the parenchyma features output from the parenchyma feature extraction unit 309 are input into the trained classified 306.

The output of the classifier 306 is given as an assessment of a prognosis to the display 307. The numerical value output by the classifier 306 can be related to the likelihood of survival or the likelihood of good prognosis, etc.

Figure 4:
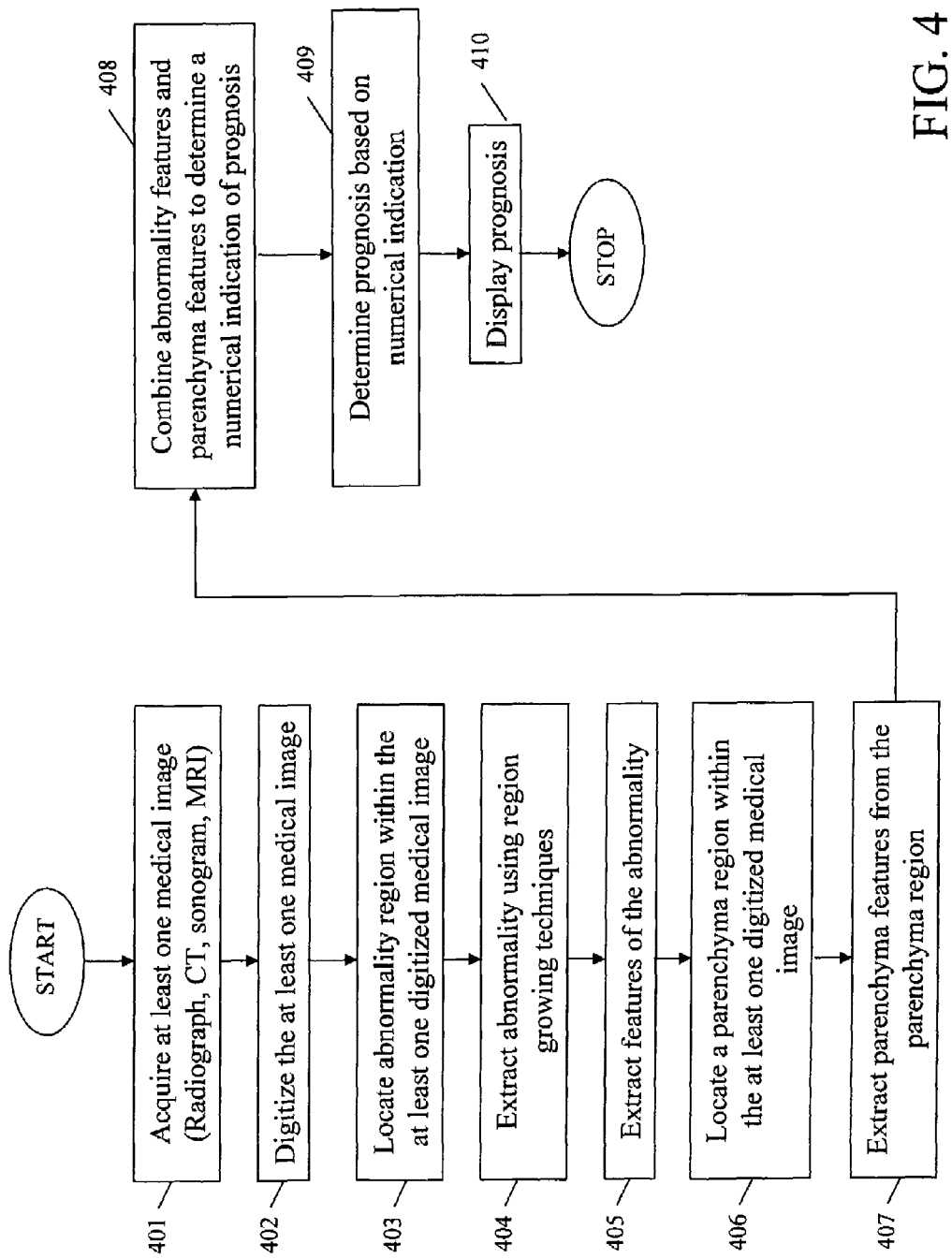
FIG. 4 illustrates the general method of computerized image analysis for assessment of a prognosis according to the present invention.

FIG. 4 illustrates the method of determining prognosis on recovery according to the present invention. In step 401, at least one medical image (e.g., sonogram, radiograph, CT scan, or MRI) is acquired. The at least one medical image obtained in step 401 is digitized in step 402. Alternatively, step 402 may be unnecessary if digitized image data is obtained in step 401, for example, from a memory device or digitized image database. For example, the screen/film mammogram would need to be digitized, but a thoracic CT image is already in a digital format.

In step 403, an abnormality is located within the at least one digitized medical image obtained in step 402. Step 403 may be done automatically by computer or manually.

Next, in step 404, the abnormality located in step 403 is extracted and segmented using region-growing techniques, as described in more detail below.

In step 405, various mathematical feature values of the abnormality are extracted, using the methods described below. Feature extraction involves various computations of mathematical descriptors of abnormality features, examples of which include texture and RGI.

In step 406, a parenchyma region within the at least one medical image is obtained. Note that the parenchyma region may be located within a different medical image from the image from which the abnormality is extracted.

Next, in step 407, various parenchyma features are extracted from the parenchyma region obtained in step 406. Parenchyma features are described in more detail below.

In step 408, the parenchyma and abnormality features calculated in steps 405 and 407 are combined using a classifier (ANN or LDA) to obtain a numerical indication of prognosis. Alternatively, the inputs to the classifier may be only the lesion features or only the parenchyma features. The numerical indication is related to the likelihood of survival or the likelihood of good prognosis, etc. In step 409, the numerical indication of prognosis is converted into a formal prognosis including likelihood of survival and treatment recommendations. The prognosis is then displayed in step 410.

Figure 5:
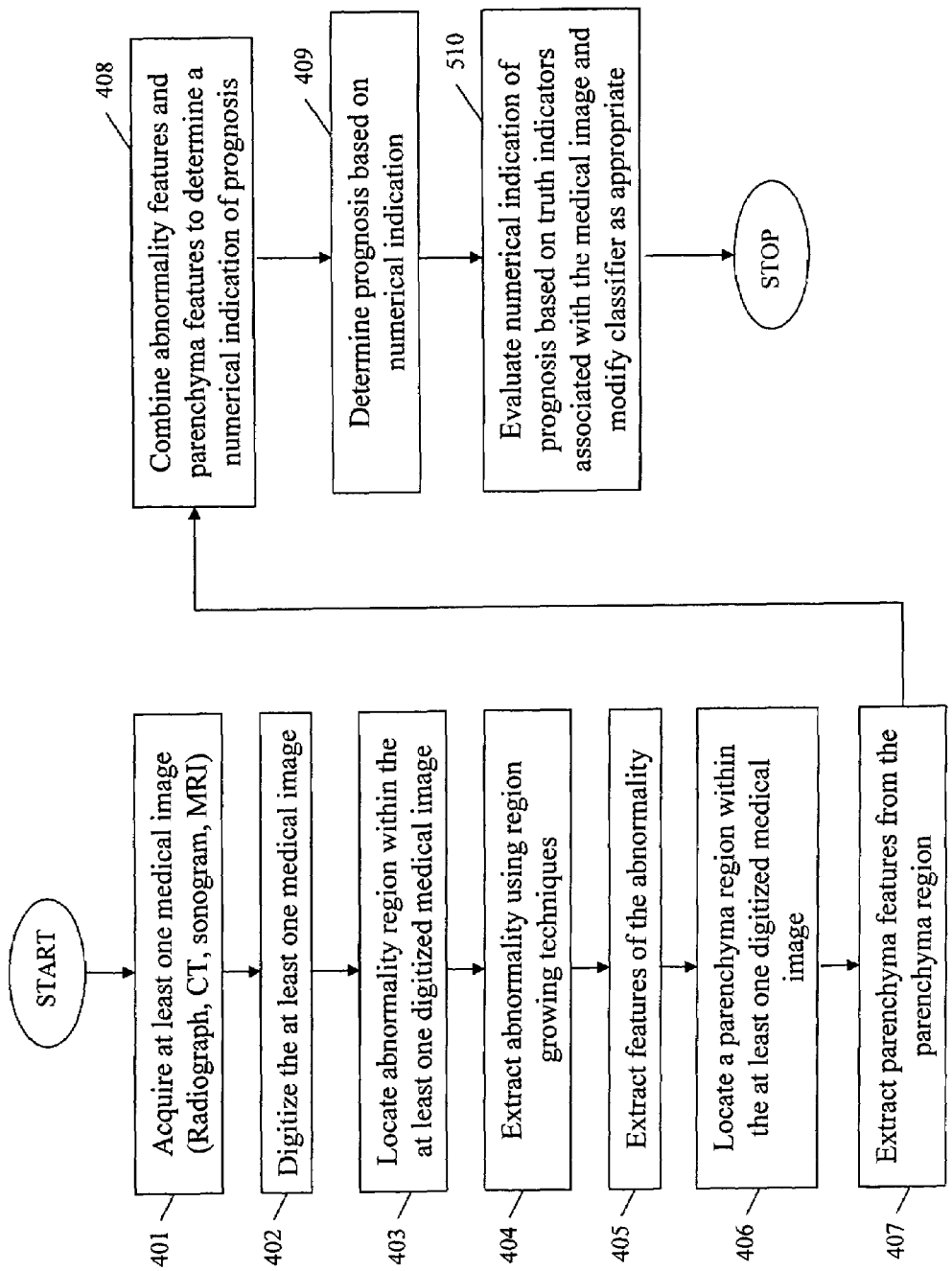
FIG. 5 illustrates the method of training a classifier for performing computerized image analysis for assessment of a prognosis according to the present invention.

FIG. 5 illustrates the preferred method of training the prognosis determination system of the present invention. Steps 401-409 shown in FIG. 5 are identical to the similarly numbered steps shown in FIG. 4, except that in the training process, known truth indicators are associated with the medical image obtained in step 401. In step 510, the numerical indication of prognosis is compared to one or more truth indicators (death, lymph node status, etc.) to evaluate the performance of the classifier (step 408). ROC analysis may be used in step 510. Based on this comparison, the classifier is modified. For example, the weights of a neural network may be adjusted based on the comparison of the truth indicators and the classifier output. The steps shown in FIG. 5 may be repeated for additional training images. The training process is described in more detail below.

Figure 12:
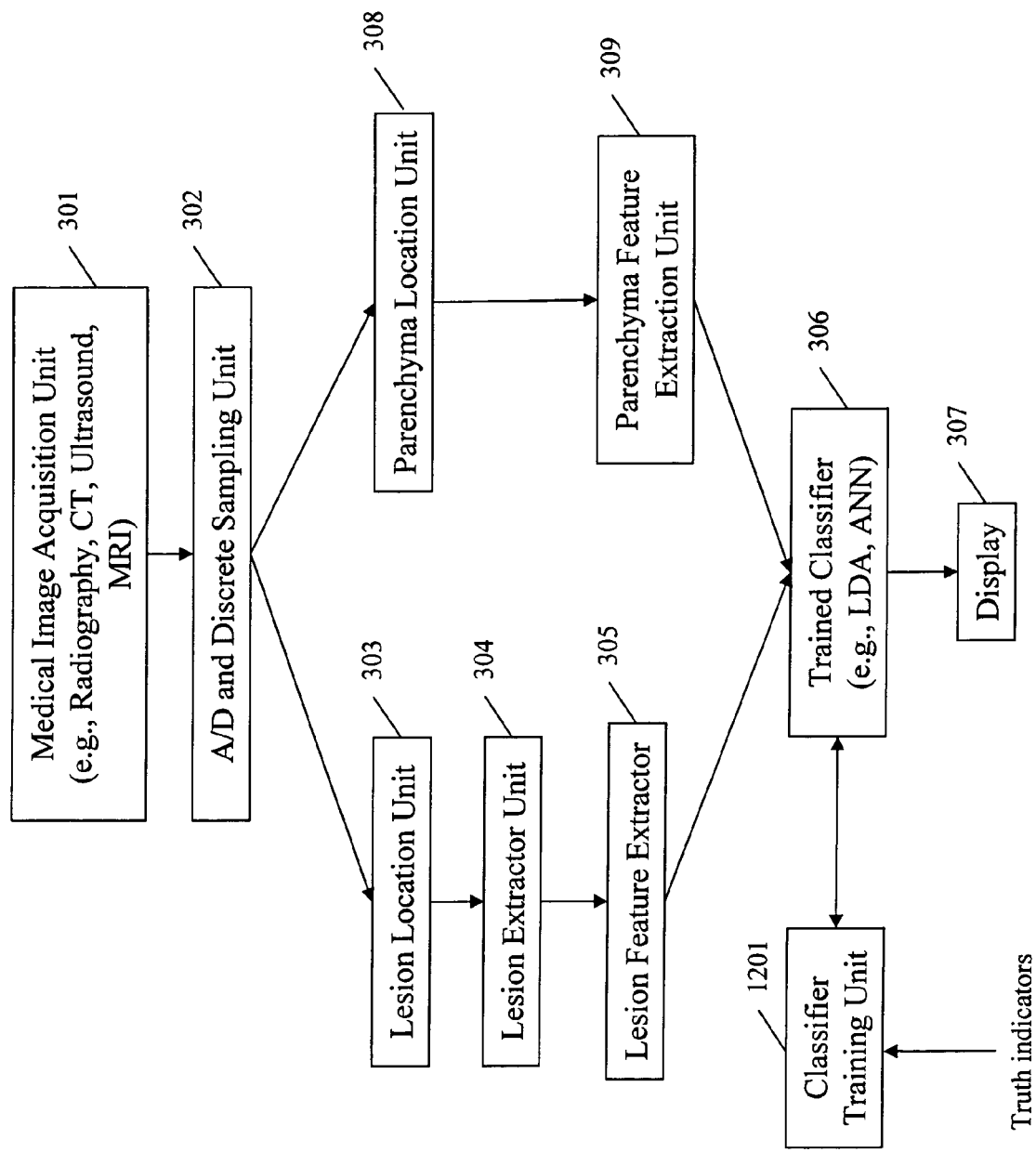
FIG. 12 is a diagram of the system for training a classifier to perform computerized image analysis for assessment of a prognosis according to the present invention.

FIG. 12 illustrates the system for training the prognosis determination system of the present invention. Note that FIG. 12 includes the overall prognosis determination system shown in FIG. 3, but also includes the Classifier Training Unit 1201, which modifies the classifier 306 based on the output of the classifier 306 and the truth indicators described above. According the system of FIG. 12 is used to implement the method described with regard to FIG. 5.

Lesion and Parenchyma Features

Figure 2:
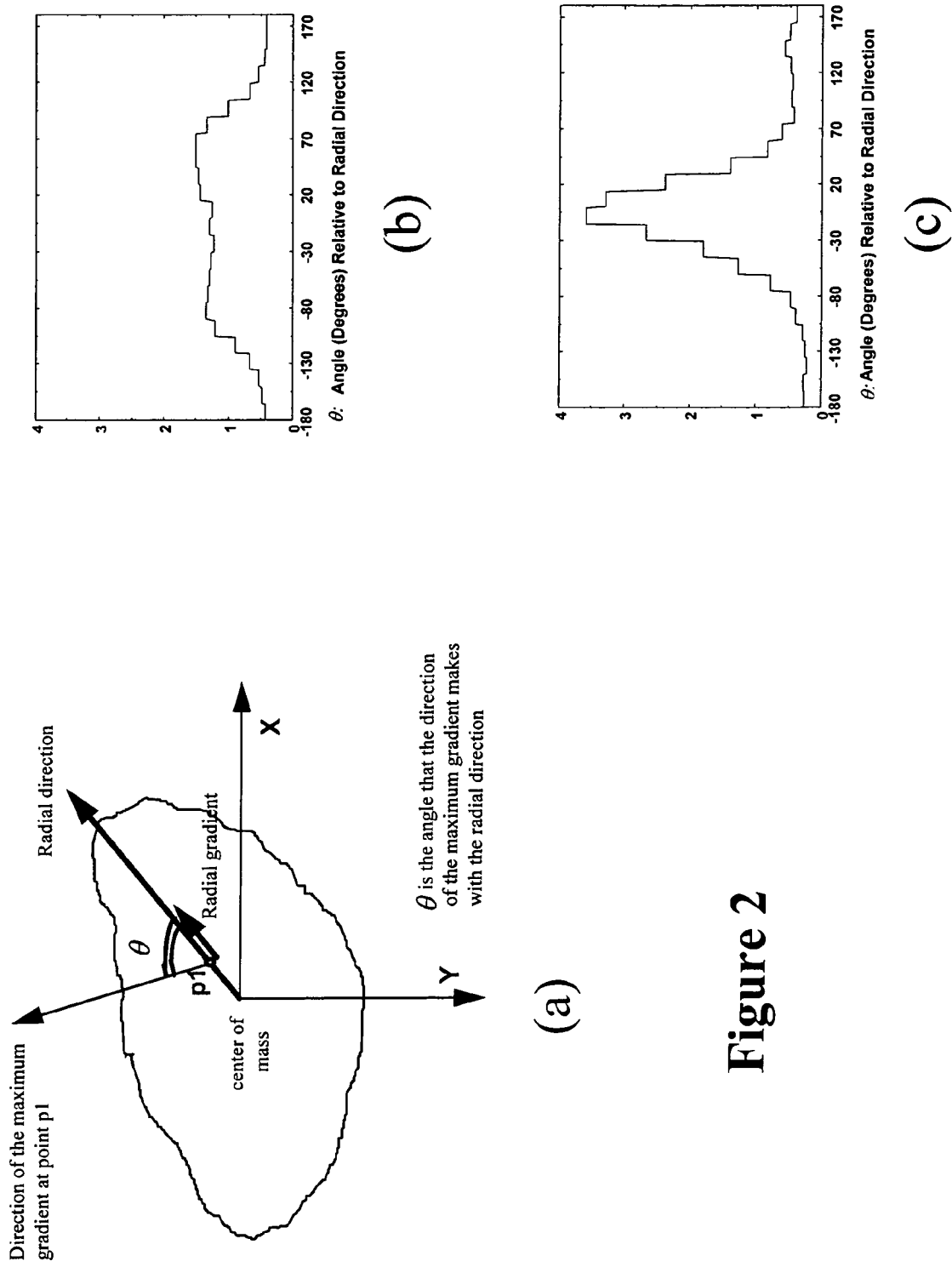
FIG. 2 shows (a) an illustration defining the radial angle as the angle between the direction of the maximum gradient and its radial direction, and a demonstration of the normalized cumulated edge-gradient distributions for (b) speculated, and (c) circular masses (FWHM is extracted from such plots to yield the spiculation measure)

Radiographically, mass lesions can be characterized by their degree of spiculation, margin definition, shape, density, homogeneity (texture), asymmetry, and temporal stability [7] [9]. The method for the characterization of mass lesions from mammograms is based on earlier work [17][21][23][24] in which a characterization scheme based on the degree of spiculation, as determined from a cumulative edge gradient histogram analysis in which the gradient is analyzed relative to the radial angle (FIG. 2), was developed. Features related to the margin, shape, and density of each mass are extracted automatically from the image data and merged into an estimate of the likelihood of malignancy [17][21][2][24]. These features include a spiculation measure (FIG. 2), a margin definition feature, and three density measures.

The mass is first extracted from the anatomic background of the mammogram using automatic region-growing techniques [17]. Features extracted are then obtained using cumulative edge gradient histogram analysis. In the cumulative edge-gradient analysis, the maximum gradient and angle of this gradient relative to the radial direction is calculated. Note that here the spiculation feature (based on the radial direction) is used in distinguishing between spiculated lesions and round lesions. Also, the average gradient along the margin of a mass will be calculated to describe the sharpness of the margin. Higher values indicate a sharper margin, and thus a higher likelihood that the lesion is benign.

In addition, a radial gradient index (normalized radial gradient) that describes the circularity and density characteristics of a lesion is used and is given by $$RGI = \frac{\sum_{P \in L} \cos\varphi \sqrt{D_x^2 + D_y^2}}{\sum_{P \in L} \sqrt{D_x^2 + D_y^2}}.$$

Here RGI is the radial gradient index ($-1 \leq RGI \leq 1$); P is an image point; L is a lesion excluding the center part; $D_x$ is the gradient in x-direction; $D_y$ is the gradient in y-direction; and $\phi$ is the angle between the gradient vector and the connection line from the center point to a neighbor point.

Although the radiographic density of a mass may not be by itself as powerful a prognostic index, taken with other features, density assessment may be extremely useful. The evaluation of the density of a mass may be of particular importance in assessing lesions that are not spiculated.

In order to assess the density of a mass radiographically, three density-related measures (average gray level, contrast, and texture measure) that characterize different aspects of the density of a mass are used. These measures are similar to those used intuitively by radiologists. Average gray level is obtained by averaging the gray level values of each point within the grown region of a mass. Contrast is the difference between the average gray level of the grown mass and the average gray level of the surrounding fatty areas (areas with gray-level values in the lower 20% of the histogram for the total surrounding area). Texture is defined here as the standard deviation of the average gradient within a mass and it is used to quantify patterns arising from veins, trabeculae, and other structures that may be visible through a low-density mass, but not through a high-density mass. A mass of low radiographic density should have low values of average gray level and contrast, and a high value of the texture measure, whereas a mass of high radiographic density should have high values of average gray level and contrast, and a low value of the texture measure.

In the present invention, computer-extracted mammographic features such as skewness and RMS variation from Fourier analysis are used to characterize denseness, and the mathematical descriptors of coarseness and contrast are used to characterize the heterogeneity of the parenchymal texture patterns in the breast [41][42]. A dense region of interest (ROI) tends to have more pixels with high gray-level values (low optical density), yielding a gray-level histogram skewed to the left. A fatty ROI tends to have more pixels with low gray-level values (high optical density), yielding a gray-level histogram skewed to the right. Features such as skewness and balance (defined below) of a histogram relative to the mean can be used to quantify the ratio of pixels with high gray-level values to those with low gray-level values relative to the mean, thereby approximating the local tissue composition (e.g., fibroglandular tissue vs. fat). A dense ROI should yield a negative value of skewness and a value greater than one for balance, whereas a fatty ROI should yield a positive value of skewness and a value less than one for balance. The skewness measure has been studied by Byng et al. [43] to evaluate percent mammographic density in the breast. A related balance measure has been studied by Tahoces et al. [44] to classify mammographic patterns into the Wolfe pattern.

In the present invention, skewness is calculated using the second and third moments of the gray-level distribution of pixels in an ROI:

$$\text{SKEWNESS} = \frac{m_3}{m_2^{3/2}} \text{ wherein}$$

$$m_k = \sum_{i=0}^{G_h} n_i(i-\bar{i})^k / N,$$

$$N = \sum_{i=0}^{G_h} n_i, \quad \bar{i} = \sum_{i=0}^{G_h} n_i i$$

and $n_i$ is the number of occurrences of gray-level value i. $G_h$ is the highest gray-level value in the ROI.

Coarseness and contrast were used to characterize Wolfe pattern by Tahoces et al. [44]. The mathematical definitions of these two texture features are given below. The coarseness of a texture is defined by the amount of local variation in gray level. The contrast of a texture is defined by the amount of differences among all gray levels in the ROI and the amount of local variation in gray level presented in the ROI. Note that the contrast measure is determined by two terms: the gray-level differences in an ROI weighted by the amount of local variation. Thus, ROIs that have similar gray level differences may have different contrast depending on the local variation in the ROIs. Conversely, ROIs that have the same amount of local variation may have different contrast depending on the gray level differences in the ROIs. In the present invention, coarseness (local uniformity) is given by:

$$\text{COARSE} = \left[\sum_{i}^{G_h} p_i s(i)\right]^{-1}$$

Contrast (local contrast) is given by:

$$\text{CON} = \left[\frac{1}{N_g(N_g-1)} \sum_{i=0}^{G_h} \sum_{j=0}^{G_h} p_i p_j (i-j)^2\right] \left[\frac{1}{n^2} \sum_{i=0}^{G_h} s(i)\right]$$

where $N_g$ is the total number of different gray levels present in the ROI, $G_h$ is the highest gray-level value in the ROI, $p_i$ is the probability of occurrence of gray-level value i, N is the width of the ROI, d is the neighborhood size (half of the operating kernel size), n=N−2d, and the ith entry of s is given by:

$$s(i) = \begin{cases} \sum |i - A_i| & \text{for } i \in \{N_i\} \text{ if } N_i \neq 0 \\ 0 & \text{otherwise} \end{cases}$$

in which $\{N_i\}$ is the set of pixels having gray level i $$A_i = \frac{1}{W-1} \sum_{p=-d}^{d} \sum_{p=-d}^{d} f(x+p, y+q) \quad (p, q) \neq (0, 0) \text{ to exclude } (x, y) \text{ and}$$

$$W = (2d+1)^2 \quad (d = 1)$$

While the examples above are described for two dimensional images, it will be recognized by those skilled in the art that analogous features may be calculated directly in three dimensions for images containing data in three or more dimensions (e.g. ultrasound, MRI, or CT).

Classifiers

According to a preferred embodiment of the present invention, linear discriminant analysis (LDA) and artificial neural networks (ANNs) are used to merge features into a prognostic marker. A discriminant function can be constructed for classification of two groups of cases, e.g., lymph node positive vs. lymph node negative, presence of distal metastases vs. none, local reoccurrence vs. none, death due to breast cancer vs. live, and poor prognosis (meaning any of the above occurrences) vs. good prognosis.

In linear discriminant analysis, the discriminant function is formulated by a linear combination of the individual features. Linear discriminant analysis is a well-established statistical technique. Linear discriminant analysis is accomplished in two steps. First, a stepwise feature-selection is employed to select useful features to formulate the discriminant function. Second, the selected features are used to determine the coefficients in the discriminant function to achieve maximum separation. The criterion used to choose good feature variables in the stepwise procedure is accomplished by minimizing the ratio of the within-group sum of squares to the total sum of the squares of the distribution (Wilks' lambda), i.e., a resubstitution test. A detailed discussion of the statistical theories for the stepwise procedure using the Wilks' lambda criterion is given in the literature [45].

Artificial neural networks are a non-algorithmic approach to information processing. Unlike many artificial intelligence techniques, which require extensive knowledge of the many parameters involved, ANNs learn directly from examples that are repeatedly provided. Once trained, a neural network can distinguish among input patterns on the basis of its learning experience. In the present invention, the analysis of the cases is performed using the image features and clinical data, and a "truth" value (e.g., 1=lymph positive case and 0=lymph node negative case). Multi-layer neural networks are used with one output unit. A back-propagation algorithm with generalized delta rule and Bayesian neural networks (BANNs) (19-21) may also be used. The input, which corresponds to the various breast image features/clinical data, is provided to the input layer of the neural network. The desired output (truth) is provided to the output layer during the training process. The hidden layer, which is important in the mapping of the input patterns to the output values, is located between the input and output layers. A nonlinear logistic function is used as the activation function for each processing unit in the neural network.

In the training process for the ANN, the internal parameters of the connections between layers (including threshold values of each unit) are adjusted iteratively so that the difference between the output values and the desired results is minimized. The output of an ANN in the limit of large sample sizes approximates a mapping function that is a monotonic transformation of the likelihood ratio, i.e., it estimates an ideal observer decision variable. A principal disadvantage of conventional ANNs is the over-parameterization of the mapping function, which results in a poor approximation of an optimal mapping function given small training sample sizes. Bayesian methods are applied to ANNs in order to regularize training to improve robustness. Ruck et al. [50] proved that an ANN trained using the sum of squares error function approaches the Bayes optimal discriminant function in the limit of infinite training data. Note that this maximum likelihood method approximates the sample Bayes optimal discriminant function when one has finite training data. It is necessary, however, to approximate the population Bayes optimal discriminant function because the sample Bayes optimal discriminant function is of little practical use.

The classifiers used in the present invention can be trained using a resubstitution method and a jack-knife method, and performance in terms of area under the ROC curve ($A_z$) and partial-area-index [51] is examined as a function of classifier parameters such as number of training iterations, number of hidden units, and the learning rate. To test the capability of the classifiers to learn the image feature inputs, a resubstitution method was conducted in which the network was first trained with all the cases in the database, and then tested with the same cases used in the training. A resubstitution test indicates that the network is able to "remember" all of the input types that were used for training.

However, it is more important to test whether the network can learn a generalized set of inputs from the examples provided, and if it can then make a correct prediction for new cases that were not included in the training. Thus, a jack-knife method is employed to test the network's generalizing ability. With a jack-knife method, either (a) all but one of the cases are selected randomly from the database for training of the network, and the remaining one case is used for testing the network; the output values are then compared to the "truth" data; or (b) half the cases are used for training and the other half is used for testing; then the database is randomly split in half again and the process is repeated.

After a number of such analyses, the average $A_z$ value is computed from parameters of the ROC curves. Various combinations of training and testing pairs are selected by using a random number generator and the results are analyzed using ROC analyses. ROC curves may be obtained by fitting continuous output data from the neural networks using the LABROC4 program [52][53]. The area under the ROC curve ($A_z$) is used as an indicator of performance as well as the partial area index [53]. Once trained, the classifier will accept image features and will output a value that will be an estimated prognostic marker.

In addition to the use of two-category discriminant analysis in the present invention, multivariable Cox regression models [54] may be fit to evaluate the prognostic value of the various summary measures derived from the imaging data after controlling for known clinical and pathological predictors, such as age at diagnosis and pathologic stage. The fit of the model should be examined using the graphical checks discussed in Kay [55], and through inspection of the Schoenfeld [56] residuals. Martingale residuals may be plotted to choose the appropriate functional forms for the covariates. After performing preliminary univariate analyses, the overall modeling-building strategy is to first construct a model that includes all important clinical and pathologic covariates, and then to sequentially add the (summary) imaging variables in a stepwise manner, since it is the added prognostic value of the latter that is of primary interest. After a final model is arrived at, it is validated using the bootstrap algorithm described in Harrel et al. [57] to obtain a bias-corrected estimate of predictive accuracy.

First Prognosis Study

Figure 6:
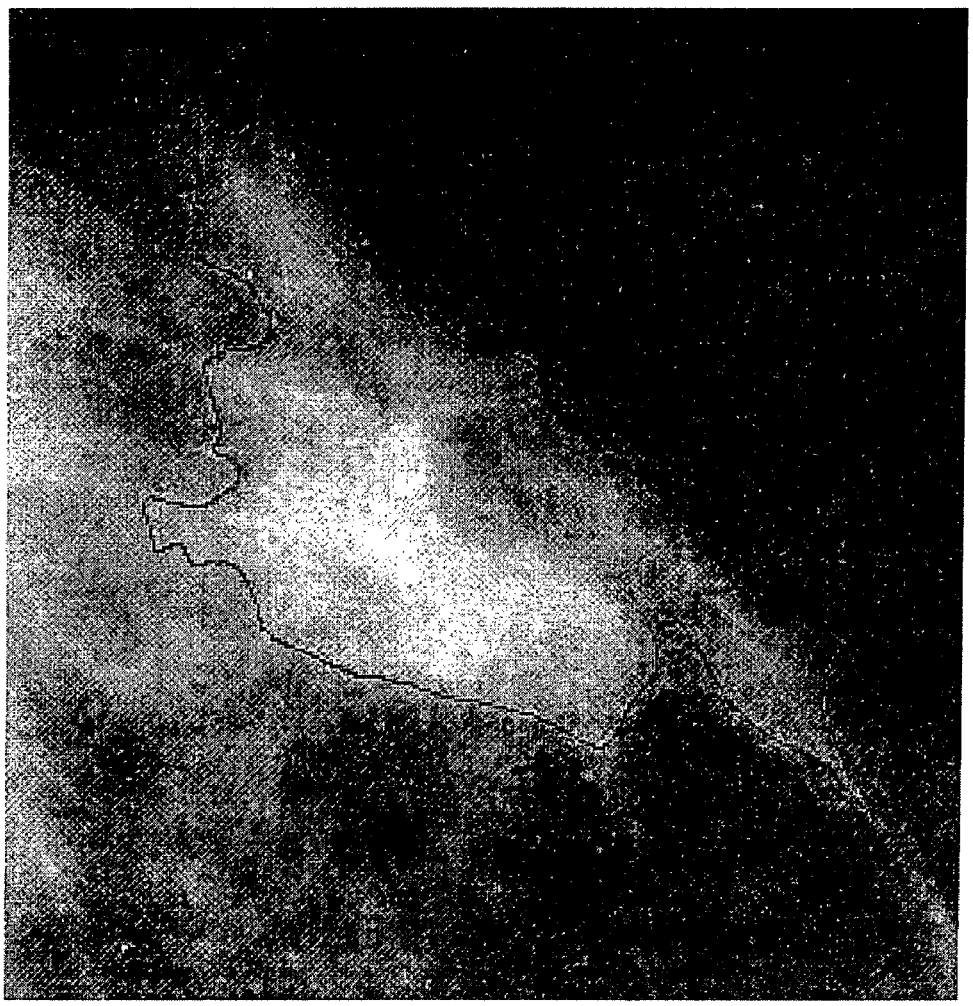
FIG. 6 shows a computer-extracted mammographic lesion with the computer-determined margin in outline.
Figure 7:
FIG. 7 shows an example of the computer analysis for a node-positive case and a node-negative case.
Figure 7:

In a first example study of the method of the present invention, the correlation between computer-extracted features of mammographic lesions with lymph node status was investigated. FIG. 6 illustrates a result from the automatic lesion extraction on a mammogram. The margin of the lesion is shown. FIG. 7 shows two example cases—one node positive and one node negative. The feature values are given for each case. For this comparison, the texture within the lesion contributes greatly to the prediction of nodal involvement. The features were merged using linear discriminant analysis, and then ROC analysis was used to assess the ability of the features to predict prognosis, via nodal involvement.

Figure 8:
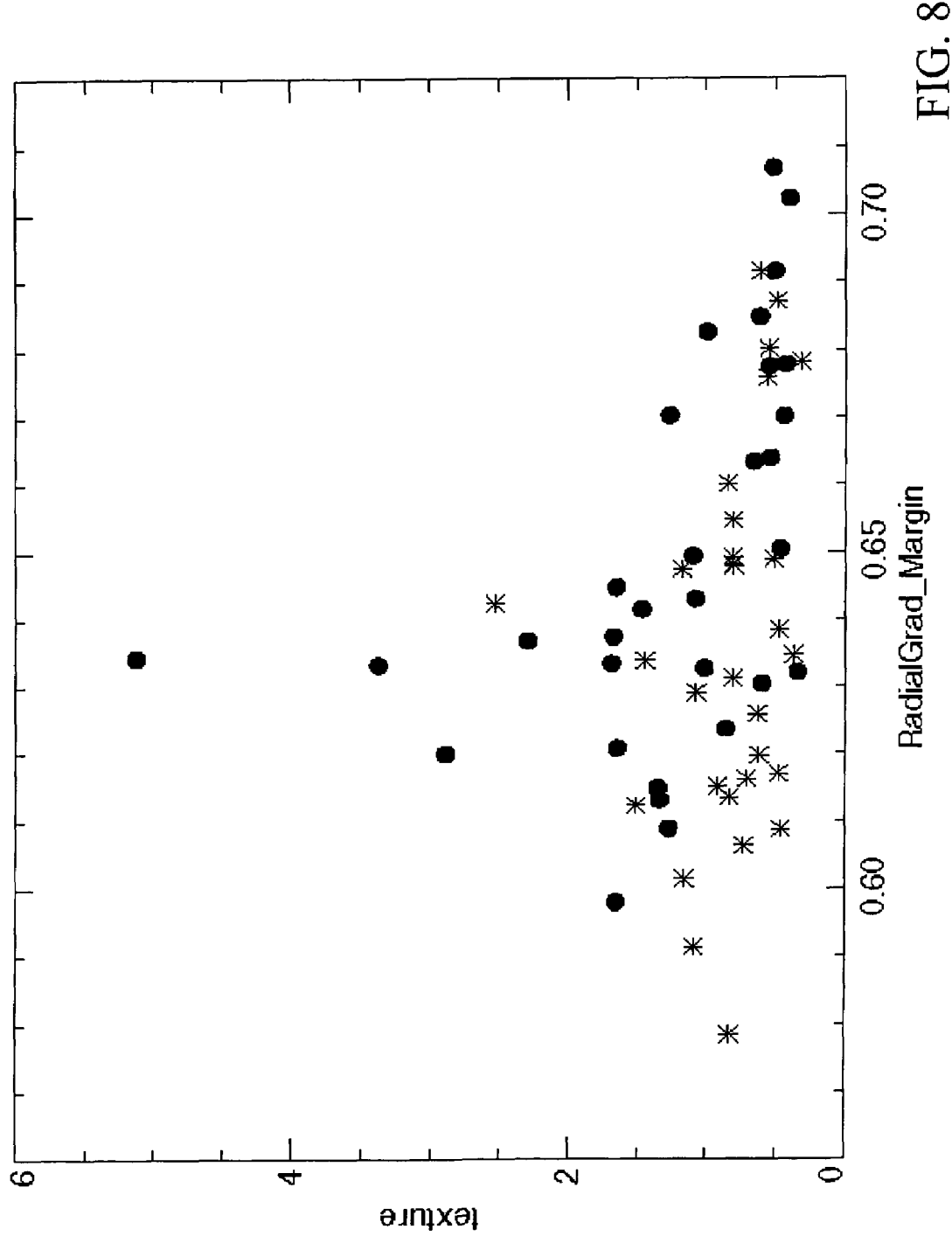
FIG. 8 shows the relationship between shape from radial gradient analysis and texture within the lesions for lesions from node-positive and node-negative breast cancer cases.

FIG. 8 shows the relationship between shape from radial gradient analysis and texture within the lesions for lesions from node-positive and node-negative breast cancer cases. The "*" data points indicate the features for the mammographic lesions from node-positive cases, while the others indicate those from node-negative cases.

Figure 9:
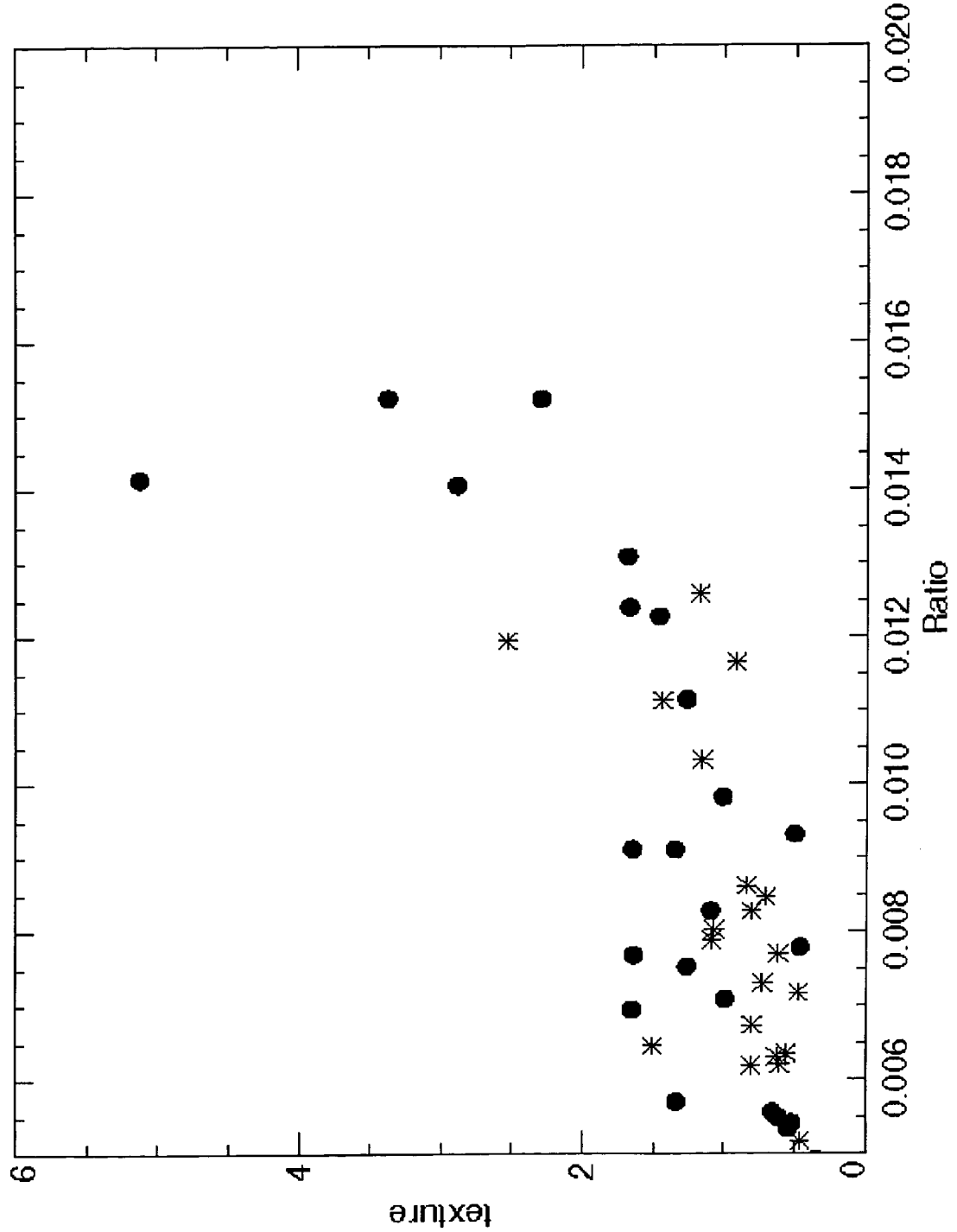
FIG. 9 shows the relationship between shape from radial gradient analysis and normalized texture within the lesions for lesions from node-positive and node-negative breast cancer cases.

FIG. 9 shows the relationship between the shape from radial gradient analysis and normalized texture within the lesions for lesions from node-positive and node-negative breast cancer cases. Here texture is the standard deviation of the gradients within the lesion divided by the average gradient within the lesion. The "*" data points indicate the features for the mammographic lesions from node-positive cases, while the others indicate those from node-negative cases.

Figure 10:
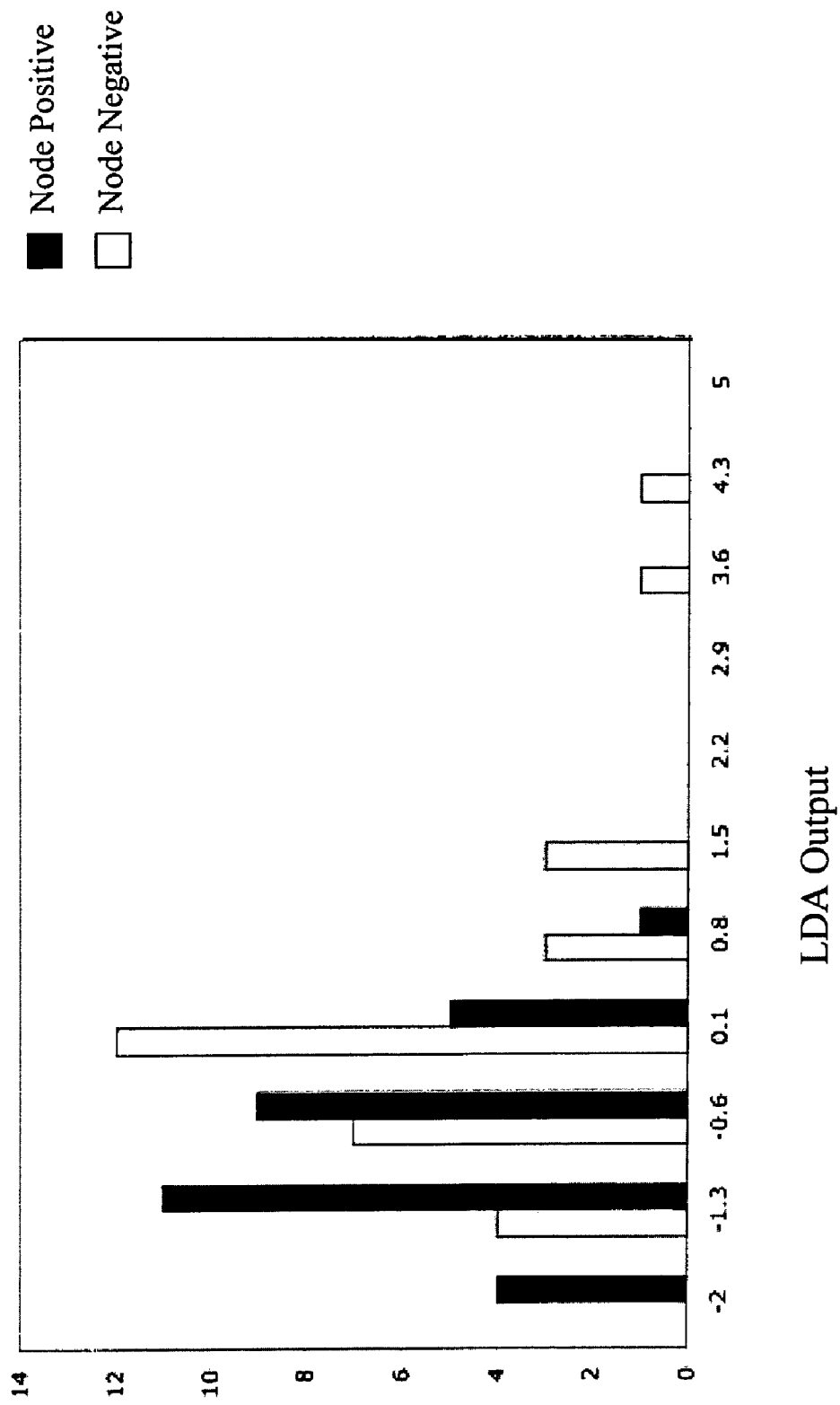
FIG. 10 shows a histogram illustrating the distribution of node-positive and node-negative cases in terms of the output from linear discriminant analysis.

FIG. 10 shows a histogram illustrating the distribution of node-positive and node-negative cases in terms of the output from the linear discriminant analysis.

It should be noted that here the classifier to merge the lesion features was trained using nodal involvement. Training can also be performed using truth of other clinical prognostic factors such as presence of metastatic disease, local recurrence, death, and/or a combination.

The output from the classifier is an assessment of prognosis for the case (patient). For example, the numerical value of the classifier output is related to a likelihood for survival, i.e., the aggressiveness of the tumor. It is expected that the computerized image analysis prognostic system will yield non-invasive prognostic indicators which can be used to aid the physician in decision-making regarding patient management and treatment.

Note also that some computer-extracted features from the lesion are useful for diagnosis (malignant vs. benign) whereas other features are more useful for prognosis (good prognosis vs. poor prognosis). For example, while the computer-extracted spiculation feature described here (FWHM of the cumulative radial gradient histogram) is a strong feature for characterizing malignant (cancerous) lesions from benign (non-cancerous) lesions, it is not as strong in the task for assessing prognosis—good prognosis vs. poor prognosis. On the other hand, texture in terms of standard deviation of the gradients within the lesion region is stronger for prognosis than diagnosis.

For prognosis, seventeen features were initially evaluated for their potential in assessing prognostic status of a cancer on mammogram. Four NRG (normalized radial gradient) features were evaluated, including: (1) NRG (margin) calculated along the margin of the lesion, (2) NRG (border) calculated in a widened border of the lesion, (3) NRG (within) calculated within the lesion, and (4) NRG (ROI) calculated within an ROI encompassing the lesion. Four FWHM features were evaluated including: (5) FWHM (margin) calculated along the margin of the lesion, (6) FWHM (border) calculated in a widened border of the lesion, (7) FWHM (within) calculated within the lesion, and (8) FWHM(ROI) calculated within an ROI encompassing the lesion. Additional evaluated features include: (9) Average Gradient within the lesion, (10) Margin Sharpness (gradient along the margin), (11) Effective Diameter (diameter of a circle having the same area as the lesion), (12) Texture (standard deviation of the gradient within the lesion), (13) Ratio ("Texture" divided by "Average Gradient"). Two contrast features were also evaluated: (14) the difference in gray levels between a center pixel and a band surrounding the boundary of the segmented lesion, and (15) the difference in average gray level within the segmented lesion and a band surrounding the lesion. The final two features evaluated were: (16) Circularity (the ratio of the portion of the segmented lesion overlapping the circle having the "effective diameter" centered at the lesion center to the area of the segmented lesion, and (17) Irregularity (determined mathematically as $(1-\text{PERIMETER}_{EC}/\text{PERIMETER}_{SL}$; where $\text{PERIMETER}_{EC}$ is the perimeter of the circle having the "effective diameter" and $\text{PERIMETER}_{SL}$ is the perimeter of the segmented lesion.

The performance for the preferred features is given below in terms of Az value, which is the area under an ROC curve. Here the performance is evaluated in the task of distinguishing between good prognosis (node negative) and poor prognosis (node positive).

| Feature | Az |
| --- | --- |
| RGI(within) | .67 |
| RGI(border) | .64 |
| RGI(margin) | .62 |
| RGI(ROI) | .65 |
| FWHM(within) | .66 |
| FWHM(border) | .61 |
| FWHM(margin) | .62 |
| FWHM(ROI) | .65 |
| Effective Diameter | .62 |

Figure 11:
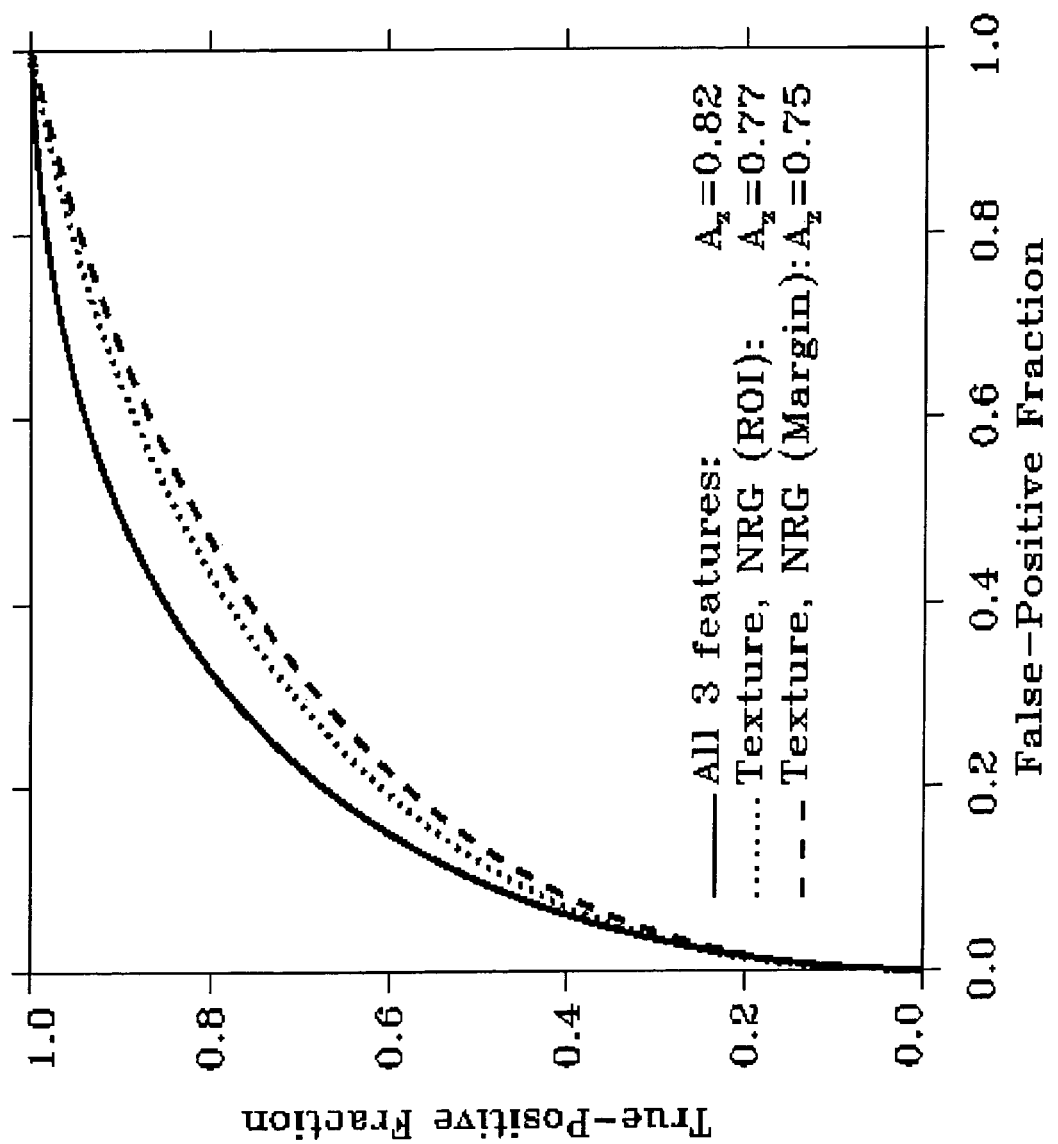
FIG. 11 shows ROC curves illustrating the performance of the system in distinguishing between cases with good and poor prognosis (in terms of nodal involvement)

The performance of the system was evaluated using ROC analysis (34) in assessing lymph node status on a database of 61 images from 43 patients with breast cancer, i.e., in distinguishing between cases with good and poor prognosis. Thirty-one images (24 patients) were lymph node negative and 30 images (19 patients) were lymph node positive. Using the three features (texture and shape), the system achieved an Az value (area under the ROC curve) of 0.82 in the task of distinguishing between node-positive cases and node-negative cases. FIG. 11 shows Az values derived by merging two and three of the above-noted features, the features being identified in FIG. 11. Performance improves as the number of relevant features being merged increases.

The training of the classifier depends on the truth from the retrospective cases used in training the classifier, e.g., in determining the weights of an artificial neural network (ANN). Since the ultimate task of the computerized image analysis system is to assess the prognosis of a given cancer case (patient), the classifier needs to be trained using known prognostic indicators such as lymph node status (positive vs. negative nodal involvement), presence of local recurrence, presence of distal metastases, death, or a combination of prognostic indicators). An example of a combination is the categorization of cases into two groups—good prognosis and poor prognosis—in which a patient case would be placed in the poor prognosis category if any of the indicators was present, e.g., as long as there existed nodal involvement, local recurrence, distal metastases, or death. It should be noted that with the individual prognostic indicators and the combined method, the training is done using binary truth—good or poor prognosis. Another method of combining the truths is to indicate severity using a rating system, such as 1 if one of the indicators is present, 2 if two are present, and so on. Then the training of the classifier could be done with a "continuous" truth instead of a binary truth. Once trained, the computerized image analysis prognostic system will yield non-invasive prognostic indicators that can be used to aid the physician in decision-making regarding patient management and treatment.

Second Prognosis Study

In a second study of the method of the present invention, the correlation of lymph node status with computer-extracted features of mammographic breast lesions was examined. Eighty-one images from 51 breast cancer patients were collected along with the corresponding clinical information on nodal status. Thirty-three patients (48 images) were lymph node negative and eighteen patients (33 images) were lymph node positive. The mammograms were digitized at 12 bit (0.05 mm pixel size) and then subsequently subsampled to 0.1 mm. Locations of each cancer were manually identified by a radiologist and an ROI about each lesion was extracted. Given the center of each lesion, an automated method for lesion extraction and feature extraction was run. Fifteen computer-extracted features characterizing the lesion in terms of spiculation, margin, texture, and size were output and then merged using linear discriminant analysis. In addition, for each lesion, a corresponding parenchymal region on the contralateral breast behind the nipple was extracted. Twenty-three features characterizing the parenchyma were extracted. Selected features were merged using linear discriminant analysis. ROC analysis was used to assess the ability of the features to predict nodal involvement. Using ROC analysis, the combined computer-extracted features of texture and radial gradient yielded an Az value of 0.80 (resubstitution) and 0.75 (round robin) in the task of separating into two groups: node positive and node negative. Combining the features with parenchymal features using linear discriminant analysis yielded an Az of 0.87 (resubstitution) and 0.80 (round robin). These results indicate the potential for the use of computer-extracted mammographic features in the assessment of cancer patients and their prognosis.

Although the prognosis method of the present invention has been presented in the context of processing mammographic breast images, the method can be implemented using other breast images, e.g., sonographic breast images, in which a computerized image analysis is performed with respect to cancer or some other disease state. For example, using sonographic breast images, ultrasound lesions characteristics such as lesion margin sharpness and posterior acoustic characteristics can be used as lesion feature values in the method of the present invention. Moreover, the calculation of ultrasonic lesion characteristics is known in this art. See U.S. Pat. No. 5,984,870 (Giber et al., *Method and system for the automated analysis of lesions in ultrasound images*), the contents of which are incorporated herein by reference. In addition, texture analysis on the sonographic parenchyma can be used as a parenchyma feature value in a manner analogous to the use of the parenchyma feature values described above for digital mammographic images. See U.S. Pat. No. 6,282,305 (Huo et al., *Method and system for the computerized assessment of breast cancer risk*), the contents of which are incorporated herein by reference.

The present method can also be implemented more generally on other medical images of other organs (e.g., chest radiographs, or CT scans of the thorax, abdomen, or skeletal system) with respect to some other disease state or state of risk. Lesion and parenchyma feature values can readily be obtained from other medical images by those of ordinary skill in the art. For example, characteristics associated with a detected benign colonic region can be used as parenchyma feature values to modulate quantitative measures of malignancy calculated in methods of detecting cancerous polyps using colonographic images. The detection of such colonic polyps is discussed in co-pending U.S. patent application Ser. No. 10/270,674 (Yoshida et al., *Method for the computer-aided detection of three-dimensional lesions*), the contents of which are incorporated herein by reference. Moreover, the detection of lesion feature values in various medical images is also well known in this art. See, e.g., U.S. Pat. No. 5,881,124 (Giger et al., *Automated method and system for the detection of lesions in medical computed tomographic scans*), the contents of which are incorporated herein by reference.

For the purposes of this description an image is defined to be a representation of a physical scene, in which the image has been generated by some imaging technology: examples of imaging technology could include television or CCD cameras or X-ray, sonar, or ultrasound imaging devices. The initial medium on which an image is recorded could be an electronic solid-state device, a photographic film, or some other device such as a photostimulable phosphor. That recorded image could then be converted into digital form by a combination of electronic (as in the case of a CCD signal) or mechanical/optical means (as in the case of digitizing a photographic film or digitizing the data from a photostimulable phosphor). The number of dimensions that an image could have could be one (e.g. acoustic signals), two (e.g. X-ray radiological images), or more (e.g. nuclear magnetic resonance images).

The present invention, while described above for the prognosis of breast cancer patients, can be used after appropriate feature calculation and classifier training for other modalities and cancer status assessment. For example, cancerous breast cancer lesions can be evaluated on x-ray (mammogram), ultrasound, and/or magnetic resonance images of the breast. Some features such as sharpness of the lesion margin (in terms of gradients) is a mathematical lesion descriptor that can be extracted on all three of these modalities. However some features are specific to the modality, such as the acoustic behaviour of lesions on ultrasound images and the uptake characteristics of contrast medium of lesions on magnetic resonance images. The feature of texture described here can be extracted across modalities. In addition, various lesion features are useful in characterizing lesions in other cancer sites. For example, the radial gradient analysis, the spiculation feature, and the texture in terms of standard deviation of the gradients within a lesion can be extracted on radiographic images of the chest to assess lung tumors. The same type of truth can then be used to train classifiers. Once trained, the computerized image analysis prognostic system will yield non-invasive prognostic indicators that can be used to aid the physician in decision-making regarding patient management and treatment.

As disclosed in cross-referenced pending patent application Ser. No. 09/773,636, FIG. 9 of that patent application is a schematic illustration of a general purpose computer 900 which can be programmed according to the teachings of the present invention. In FIG. 9 of the cross-referenced application Ser. No. 09/773,636, the computer 900 can be used to implement the processes of the present invention, wherein the computer includes, for example, a display device 902 (e.g., a touch screen monitor with a touch-screen interface, etc.), a keyboard 904, a pointing device 906, a mouse pad or digitizing pad 908, a hard disk 910, or other fixed, high density media drives, connected using an appropriate device bus (e.g., a SCSI bus, an Enhanced IDE bus, an Ultra DMA bus, a PCI bus, etc.), a floppy drive 912, a tape or CD ROM drive 914 with tape or CD media 916, or other removable media devices, such as magneto-optical media, etc., and a mother board 918. The mother board 918 includes, for example, a processor 920, a RAM 922, and a ROM 924 (e.g., DRAM, ROM, EPROM, EEPROM, SRAM, SDRAM, and Flash RAM, etc.), I/O ports 926 which may be used to couple to an image acquisition device and optional special purpose logic devices (e.g., ASICs, etc.) or configurable logic devices (e.g., GAL and re-programmable FPGA) 928 for performing specialized hardware/software functions, such as sound processing, image processing, signal processing, neural network processing, automated classification, etc., a microphone 930, and a speaker or speakers 932.

As stated above, the system of the present invention includes at least one computer readable medium. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer and for enabling the computer to interact with a human user. Such software may include, but is not limited to, device drivers, operating systems and user applications, such as development tools. Such computer readable media further includes the computer program product of the present invention for performing any of the processes according to the present invention, described above. The computer code devices of the present invention can be any interpreted or executable code mechanism, including but not limited to scripts, interpreters, dynamic link libraries, Java classes, and complete executable programs, etc.

The programming of general purpose computer 900 (disclosed in cross-referenced pending patent application Ser. No. 09/773,636) may include a software module for digitizing and storing images obtained from film or an image acquisition device. Alternatively, the present invention can also be implemented to process digital data derived from images obtained by other means, such as a picture archive communication system (PACS). In other words, the digital images being processed may be in existence in digital form and need not be converted to digital form in practicing the invention.

Accordingly, the mechanisms and processes set forth in the present description may be implemented using a conventional general purpose microprocessor or computer programmed according to the teachings in the present specification, as will be appreciated by those skilled in the relevant art(s). Appropriate software coding can readily be prepared by skilled programmers based on the teachings of the present disclosure, as will also be apparent to those skilled in the relevant art(s). However, as will be readily apparent to those skilled in the art, the present invention also may be implemented by the preparation of application-specific integrated circuits or by interconnecting an appropriate network of conventional component circuits.

The present invention thus also includes a computer-based product which may be hosted on a storage medium and include instructions which can be used to program a general purpose microprocessor or computer to perform processes in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of processing medical image data to determine a prognosis of recovery, comprising:
   obtaining segmented image data of a portion of the medical image data corresponding to an abnormality;
   extracting at least one abnormality feature from the segmented image data corresponding to the abnormality; and
   determining the prognosis of recovery based on the extracted at least one abnormality feature, wherein the prognosis of recovery includes an indication of the likelihood of survival of a subject, wherein said determining step includes
   applying the at least one abnormality feature to a classifier trained in relation to said at least one abnormality feature obtained from at least one set of previously obtained medical data including medical image data and a set of truth indicators, the set of truth indicators including at least one of lymph node involvement, presence of metastatic disease, and presence of local recurrence, wherein said classifier is trained by comparing at least one of said truth indicators to a numerical indication of prognosis output by said classifier.

2. The method of claim 1, further comprising:
   obtaining segmented image data of a portion of the medical image data corresponding to a parenchymal region; and
   extracting at least one parenchymal feature from the segmented image data corresponding to the parenchyma region,
   wherein the determining step comprises determining the prognosis of recovery based additionally on the extracted at least one parenchymal feature.

3. The method of claim 2, wherein the step of extracting the at least one parenchyma feature comprises:
   determining at least one of skewness, coarseness, and contrast of the segmented image data corresponding to the parenchymal region.

4. The method of claim 2, wherein the step of obtaining the segmented image data of the portion of the medical image data corresponding to the parenchymal region comprises:
   obtaining mammographic image data corresponding to a region distinct from the abnormality.

5. The method of claim 1, wherein the step of obtaining the segmented image data corresponding to the abnormality comprises:
   obtaining an indication of the location of the abnormality in the medical image data; and
   performing region growing from the obtained location.

6. The method of claim 1, wherein the obtaining step comprises:
   obtaining mammographic image data.

7. The method of claim 1, wherein the extracting step comprises:
   determining a radial gradient index.

8. The method of claim 1, wherein the extracting step comprises:
   determining at least one of circularity and density of the abnormality.

9. The method of claim 1, wherein the extracting step comprises:
   determining at least one of average gray level, contrast, and a texture measure of the abnormality.

10. The method of claim 1, wherein the extracting step comprises:
    determining a spiculation measure.

11. The method of claim 10, wherein the step of determining the spiculation measure comprises:
    obtaining a cumulative edge gradient histogram of the segmented image data; and
    determining the spiculation measure based on the obtained cumulative edge gradient histogram.

12. The method of claim 1, wherein the determining step comprises:
    applying the extracted at least one abnormality feature to an artificial neural network (ANN) that classifies the abnormality at an output of the ANN.

13. The method of claim 1, wherein the determining step comprises:
    applying the extracted at least one abnormality feature to a linear discriminant that classifies the abnormality at an output of the linear discriminant.

14. The method of claim 2, wherein the step of determining the prognosis based on the extracted at least one parenchymal feature comprises:
    applying the extracted at least one parenchymal feature to an artificial neural network (ANN) that determines a numerical indication of the prognosis at an output of the ANN.

15. The method of claim 2, wherein the determining step comprises:
    applying the extracted at least one parenchymal feature to a linear discriminant that determines a numerical indication of the prognosis at an output of the linear discriminant.

16. A method of processing medical image data to determine a prognosis of recovery, comprising:
    obtaining segmented image data of a portion of the medical image data corresponding to a parenchymal region;
    extracting at least one parenchymal feature from the segmented image data corresponding to the parenchymal region; and
    determining the prognosis of recovery based on the extracted at least one parenchymal feature, wherein the prognosis of recovery includes an indication of the likelihood of survival of a subject, wherein said determining step includes
    applying the at least one parenchymal feature to a classifier trained in relation to said at least one parenchymal feature obtained from at least one set of previously obtained medical data including medical image data and a set of truth indicators, the set of truth indicators including at least one of lymph node involvement, presence of metastatic disease, and presence of local recurrence, wherein said classifier is trained by comparing at least one of said truth indicators to a numerical indication of prognosis output by said classifier.

17. A computer-readable medium storing computer program instructions which, when executed by a computer, cause the computer to process medical image data to determine a prognosis of recovery by performing the steps of:
  obtaining segmented image data of a portion of the medical image data corresponding to an abnormality;
  extracting at least one abnormality feature from the segmented image data corresponding to the abnormality; and
  determining the prognosis of recovery based on the extracted at least one abnormality feature, wherein the prognosis of recovery includes an indication of the likelihood of survival of a subject, wherein said determining step includes
  applying the at least one abnormality feature to a classifier trained in relation to said at least one abnormality feature obtained from at least one set of previously obtained medical data including medical image data and a set of truth indicators, the set of truth indicators including at least one of lymph node involvement, presence of metastatic disease, and presence of local recurrence, wherein said classifier is trained by comparing at least one of said truth indicators to a numerical indication of prognosis output by said classifier.

18. The computer-readable medium of claim 17, wherein the computer program further causes the computer to perform the steps of:
  obtaining segmented image data of a portion of the medical image data corresponding to a parenchymal region; and
  extracting at least one parenchymal feature from the segmented image data corresponding to the parenchyma region,
  wherein the determining step comprises determining the prognosis of recovery based additionally on the extracted at least one parenchymal feature.

19. The computer-readable medium of claim 18, wherein the step of extracting the at least one parenchyma feature comprises:
  determining at least one of skewness, coarseness, and contrast of the segmented image data corresponding to the parenchymal region.

20. The computer-readable medium of claim 18, wherein the step of obtaining the segmented image data of the portion of the medical image data corresponding to the parenchymal region comprises:
  obtaining mammographic image data corresponding to a region distinct from the abnormality.

21. The computer-readable medium of claim 17, wherein the step of obtaining the segmented image data corresponding to the abnormality comprises:
  obtaining an indication of the location of the abnormality in the medical image data; and
  performing region growing from the obtained location.

22. The computer-readable medium of claim 17, wherein the obtaining step comprises:
  obtaining mammographic image data.

23. The computer-readable medium of claim 17, wherein the extracting step comprises:
  determining a radial gradient index.

24. The computer-readable medium of claim 17, wherein the extracting step comprises:
  determining at least one of circularity and density of the abnormality.

25. The computer-readable medium of claim 17, wherein the extracting step comprises:
  determining at least one of average gray level, contrast, and a texture measure of the abnormality.

26. The computer-readable medium of claim 17, wherein the extracting step comprises:
  determining a spiculation measure.

27. The computer-readable medium of claim 26, wherein the step of determining the spiculation measure comprises:
  obtaining a cumulative edge gradient histogram of the segmented image data; and
  determining the spiculation measure based on the obtained cumulative edge gradient histogram.

28. The computer-readable medium of claim 17, wherein the determining step comprises:
  applying the extracted at least one abnormality feature to an artificial neural network (ANN) that classifies the abnormality at an output of the ANN.

29. The computer-readable medium of claim 17, wherein the determining step comprises:
  applying the extracted at least one abnormality feature to a linear discriminant that classifies the abnormality at an output of the linear discriminant.

30. The computer-readable medium of claim 18, wherein the step of determining the prognosis based on the extracted at least one parenchymal feature comprises:
  applying the extracted at least one parenchymal feature to an artificial neural network (ANN) that determines a numerical indication of the prognosis at an output of the ANN.

31. The computer-readable medium of claim 18, wherein the determining step comprises:
  applying the extracted at least one parenchymal feature to a linear discriminant that determines a numerical indication of the prognosis at an output of the linear discriminant.

32. A computer-readable medium storing computer program instructions which, when executed by a computer, cause the computer to process medical image data to determine a prognosis of recovery by performing the steps of:
  obtaining segmented image data of a portion of the medical image data corresponding to a parenchymal region;
  extracting at least one parenchymal feature from the segmented image data corresponding to the parenchymal region; and
  determining the prognosis of recovery based on the extracted at least one parenchymal feature, wherein the prognosis of recovery includes an indication of the likelihood of survival of a subject, wherein said determining step includes
  applying the at least one parenchymal feature to a classifier trained in relation to said at least one parenchymal feature obtained from at least one set of previously obtained medical data including medical image data and a set of truth indicators, the set of truth indicators including at least one of lymph node involvement, presence of metastatic disease, and presence of local recurrence, wherein said classifier is trained by comparing at least one of said truth indicators to a numerical indication of prognosis output by said classifier.

33. A system for processing medical image data to determine a prognosis of recovery, comprising:
  an image acquisition unit configured to obtain segmented image data of a portion of the medical image data corresponding to an abnormality; and
  a processor configured to extract at least one abnormality feature from the segmented image data corresponding to the abnormality, and to determine the prognosis of recovery based on the extracted at least one abnormality feature, wherein the prognosis of recovery includes an indication of the likelihood of survival of a subject, wherein said processor is configured to apply the at least one abnormality feature to a classifier trained in relation to said at least one abnormality feature obtained from at least one set of previously obtained medical data including medical image data and a set of truth indicators, the set of truth indicators including at least one of lymph node involvement, presence of metastatic disease, and presence of local recurrence, wherein said classifier is trained by comparing at least one of said truth indicators to a numerical indication of prognosis output by said classifier.

34. The system of claim 33, wherein:
the image acquisition unit is configured to obtain segmented image data of a portion of the medical image data corresponding to a parenchymal region; and
the processor is configured to extract at least one parenchymal feature from the segmented image data corresponding to the parenchyma region, and to determine the prognosis of recovery based additionally on the extracted at least one parenchymal feature.

35. The system of claim 34, wherein the processor is configured to determine at least one of skewness, coarseness, and contrast of the segmented image data corresponding to the parenchymal region.

36. The system of claim 34, wherein the image acquisition unit is configured to obtain mammographic image data corresponding to a region distinct from the abnormality.

37. The system of claim 33, wherein:
the image acquisition unit is configured to obtain an indication of the location of the abnormality in the medical image data; and
the processor is configured to perform region growing from the obtained location.

38. The system of claim 33, wherein the image acquisition unit is configured to obtain mammographic image data.

39. The system of claim 33, wherein the processor is configured to determine a radial gradient index.

40. The system of claim 33, wherein the processor is configured to determine at least one of circularity and density of the abnormality.

41. The system of claim 33, wherein the processor is configured to determine at least one of average gray level, contrast, and a texture measure of the abnormality.

42. The system of claim 33, wherein the processor is configured to determine a spiculation measure.

43. The system of claim 42, wherein the processor is configured to obtain a cumulative edge gradient histogram of the segmented image data, and to determine the spiculation measure based on the obtained cumulative edge gradient histogram.

44. The system of claim 33, wherein the processor is configured to apply the extracted at least one abnormality feature to an artificial neural network (ANN) that classifies the abnormality at an output of the ANN.

45. The system of claim 33, wherein the processor is configured to apply the extracted at least one abnormality feature to a linear discriminant that classifies the abnormality at an output of the linear discriminant.

46. The system of claim 34, wherein the processor is configured to apply the extracted at least one parenchymal feature to an artificial neural network (ANN) that determines a numerical indication of the prognosis at an output of the ANN.

47. The system of claim 34, wherein the processor is configured to apply the extracted at least one parenchymal feature to a linear discriminant that determines a numerical indication of the prognosis at an output of the linear discriminant.

48. A system for processing medical image data to determine a prognosis of recovery, comprising:
an image acquisition unit configured to obtain segmented image data of a portion of the medical image data corresponding to a parenchymal region; and
a processor configured to extract at least one parenchymal feature from the segmented image data corresponding to the parenchymal region, and to determine the prognosis of recovery based on the extracted at least one parenchymal feature, wherein the prognosis of recovery includes an indication of the likelihood of survival of a subject, wherein the processor is configured to apply the at least one parenchymal feature to a classifier trained in relation to said at least one parenchymal feature obtained from at least one set of previously obtained medical data including medical image data and a set of truth indicators, the set of truth indicators including at least one of lymph node involvement, presence of metastatic disease, and presence of local recurrence, wherein said classifier is trained by comparing at least one of said truth indicators to a numerical indication of prognosis output by said classifier.

* * * * *